(12) United States Patent
Gomiero

(10) Patent No.: US 12,427,865 B2
(45) Date of Patent: Sep. 30, 2025

(54) ELECTRIC POWERED SELF-PROPELLED DRIVING MACHINE

(71) Applicant: AGRIROBOT GPS S.R.L., Padua (IT)

(72) Inventor: Paolo Sante Gomiero, Limena (IT)

(73) Assignee: AGRIROBOT GPS S.R.L., Padua (IT)

( * ) Notice: Subject to any disclaimer, the term of this patent is extended or adjusted under 35 U.S.C. 154(b) by 742 days.

(21) Appl. No.: 17/757,980

(22) PCT Filed: Dec. 30, 2020

(86) PCT No.: PCT/IB2020/062532
§ 371 (c)(1),
(2) Date: Jun. 24, 2022

(87) PCT Pub. No.: WO2021/137165
PCT Pub. Date: Jul. 8, 2021

(65) Prior Publication Data
US 2023/0014070 A1    Jan. 19, 2023

(30) Foreign Application Priority Data
Dec. 31, 2019    (IT) .................. 102019000025828

(51) Int. Cl.
*B60L 9/00*    (2019.01)
*A01B 63/32*    (2006.01)
(Continued)

(52) U.S. Cl.
CPC .............. *B60L 9/00* (2013.01); *A01B 63/32* (2013.01); *A01B 69/008* (2013.01); *A01B 76/00* (2013.01);
(Continued)

(58) Field of Classification Search
CPC ...... B60L 9/04; B60L 9/08; B60L 9/14; B60L 9/18; B60L 9/24; B60L 9/30; A01B 63/104; A01B 63/12
See application file for complete search history.

(56) References Cited

U.S. PATENT DOCUMENTS

| 3,632,906 A | 1/1972 | Aihara |
| 4,108,264 A | 8/1978 | Tanaka |
| (Continued) | | |

FOREIGN PATENT DOCUMENTS

EP    2517921 A2    10/2012

OTHER PUBLICATIONS

Patent Cooperation Treaty, International Search Report and Written Opinion for International Application No. PCT/IB2020/062532, Jun. 15, 2021, 24 pages.

*Primary Examiner* — Jeffrey J Restifo
(74) *Attorney, Agent, or Firm* — Stetina Garred Brucker & Newboles

(57) ABSTRACT

An electric powered self-propelled driving machine for working a ground comprising a bearing frame adapted to remain at a given distance from a reference surface when the machine is assembled, kinematic mechanisms coupled to the bearing frame and adapted to be arranged close to said reference surface when the machine is in use, electric motorization means, coupled to the bearing frame and operatively connected to the kinematic mechanisms, adapted to be electrically operated to move the bearing frame, a power supply cable adapted to be electrically connected to the electric motorization means and to be connected to an electric power supply source, a reference rotor around which the power supply cable is wound to form an electric coil of predefined length, coupled to the bearing frame and operatively connected to first rotation means adapted to be operated to unwind/rewind the power supply cable from/onto the (Continued)

reference rotor at least during the advancement of the driving machine (1) to perform a working of a ground, and a distribution arm, operatively connected to the bearing frame and supporting the power supply cable so as to at least limit the interference thereof with the kinematic mechanisms during the advancement of the driving machine on the ground. In an innovative manner, the driving machine provides for the reference rotor, and the electric coil wound thereon, to be arranged in the central part of the bearing frame so that both the front part and the rear part of the bearing frame are frontally free and directly facing the external environment in order to accommodate, removably, both pieces of equipment for working the ground.

45 Claims, 12 Drawing Sheets

(51) Int. Cl.
| | |
|---|---|
| *A01B 69/04* | (2006.01) |
| *A01B 76/00* | (2006.01) |
| *A01B 79/00* | (2006.01) |
| *B60K 11/06* | (2006.01) |
| *B62D 55/06* | (2006.01) |
| *B62D 55/14* | (2006.01) |
| *A01B 49/02* | (2006.01) |
| *B62D 55/20* | (2006.01) |

(52) U.S. Cl.
CPC ............ *A01B 79/005* (2013.01); *B60K 11/06* (2013.01); *B62D 55/06* (2013.01); *B62D 55/14* (2013.01); *A01B 49/027* (2013.01); *B60L 2200/40* (2013.01); *B62D 55/20* (2013.01)

(56) References Cited

U.S. PATENT DOCUMENTS

| | | | |
|---|---|---|---|
| 6,016,986 A * | 1/2000 | Wright ................... | A01K 3/005 |
| | | | 242/396.9 |
| 11,884,175 B2 * | 1/2024 | Lacaze .................... | B64F 1/364 |
| 2014/0069758 A1 | 3/2014 | Tojima et al. | |
| 2014/0166419 A1 | 6/2014 | Krellner et al. | |
| 2019/0173310 A1 | 6/2019 | Alzamil | |
| 2023/0014070 A1 * | 1/2023 | Gomiero .............. | A01B 69/008 |
| 2023/0165189 A1 * | 6/2023 | López Martínez ......................... | |
| | | | A01D 34/4163 |
| | | | 30/276 |
| 2023/0331409 A1 * | 10/2023 | Opitsch ................ | B64C 39/022 |
| 2024/0284819 A1 * | 8/2024 | Sauder ................. | A01C 15/005 |
| 2024/0391093 A1 * | 11/2024 | Mura Yañez .......... | G05B 15/02 |
| 2025/0115313 A1 * | 4/2025 | Parmley ................ | B62D 55/06 |

* cited by examiner

ELECTRIC POWERED SELF-PROPELLED DRIVING MACHINE

CROSS-REFERENCE TO RELATED APPLICATIONS

This application claims priority to PCT International Application No. PCT/IB2020/062532 filed on Dec. 30, 2020, which application claims priority to Italian Patent Application No. 102019000025828 filed on Dec. 31, 2019, the disclosures of which are expressly incorporated herein by reference.

STATEMENT RE: FEDERALLY SPONSORED RESEARCH/DEVELOPMENT

Not Applicable

BACKGROUND

The current invention relates to an electric powered self-propelled driving machine, commonly known in agriculture as "agricultural tractor" and forming a vehicle used not only in agriculture, but also, for example, in the fields of gardening, do-it-yourself and urban care to tow a trailer or hook up specific equipment to carry out agricultural or civil work or to arrange outdoor public or private environments.

It should immediately be noted that the electric powered self-propelled driving machine of the invention does not house any battery pack, for example under the hood (as is found in some electric powered agricultural machines of the known art) and can also be defined as autonomous, in the sense that it is moved following a prefixed and programmed scheme of working the ground, without a person driving the agricultural driving machine (not surprisingly, such an agricultural machine of the invention lacks a driver's cab from where, in a traditional agricultural machine widespread on the market for decades, the operator supervises the ground working operations by driving or in any case managing the machine itself).

As is well known, in recent years a different sensitivity has spread in the field of agriculture, certainly more oriented to a more organic, more ecological, more natural spirit, with an apparent prevalence of products grown with eco-friendly techniques, technologies and raw materials.

However, the average consumer still continues to wonder whether the processing machines—typically agricultural tractors or garden tractors—used in agriculture or in the civil field are environmentally friendly, obtaining answers which are not always comfortable and reassuring.

The self-propelled driving machines used in agriculture today mostly consist of vehicles provided with a diesel motor, which, therefore, use diesel as the driving force, the same fuel which is banned in many urban centers; in many cases, these agricultural machines are obsolete vehicles, which therefore do not have technological equipment capable of reducing the emissions which negatively impact the atmosphere in the environment.

However, in this general context which has consolidated for several years in the agricultural industry, something is actually changing: electric powered agricultural machinery, which only a few years ago was simply a risky hypothesis, is becoming a more concrete design, and the large-scale diffusion thereof appears less remote than one might imagine.

It is no coincidence that digital technological innovations are increasingly affecting the primary industry as well, in order to efficiently and effectively support Italian products which stand out in the world for variety, quality and often also fame.

In fact, in order to be competitive today, a farmer must produce while successfully combining product quality with a competitive price, in line with market needs but without degrading the reputation of the product itself, while also safeguarding the environment and the impact which working the ground has thereon.

Thus the use of electric machinery in agriculture becomes a convenient, almost obligatory choice, destined to definitively revolutionize the approach to working ground used for harvesting, ensuring economic and at the same time environmental benefits.

However, the main problem is always the need for a radical change of mentality in the industry: organic agricultural production, with agricultural means powered by alternative sources, would allow not only the industry but even the general, productive, and political system of managing an economy to take a significant step forward, also in terms of energy savings.

An electric powered agricultural machine certainly does not have the consumption of a diesel-powered tractor, and for what matters most, it involves zero emissions of polluting or harmful gases: this is a detail of no small importance, if it is considered that the polluting discharges produced during the working of a ground by a normal tractor with a combustion engine end up directly on the agricultural production.

For example, comparing the consumption of a diesel-powered agricultural vehicle with that of an electricity-powered agricultural vehicle—using the working of 1 hectare of ground as a reference term—it is found that the former requires about 80 liters of fuel to complete the work, while the second employs about 380 kW; multiplying these values by the current average cost of diesel and by that of electricity, a fuel saving of more than 35% is obtained by using the electric tractor in working the ground.

However, there are indeed currently significant structural limitations which prevent a large-scale diffusion and marketing, with large numbers involved, of electric powered agricultural machinery.

These structural limitations are essentially due to the reduced autonomy and the high initial cost of the agricultural machinery concerned, even if for the latter aspect it is possible to make assessments in terms of tax relief and government incentives.

As far an electric-type agricultural driving machine is concerned, the autonomy is not so much related to the number of kilometers which the electric traction allows traveling: such a type of vehicle must neither compete on a track nor cover long distances on the road, but must simply work on the ground.

What it needs it's rather a powerful motorization which, inevitably, absorbs more electricity, not to mention the fact that the type of electrical power supply, mostly currently included for an agricultural machine, consists of electric charge accumulators (or secondary batteries), causes the significant problem of maintaining the power needed to drive the agricultural vehicle over time.

Currently, the best electric tractor designs ensure a working autonomy which does not exceed 4 hours, with complete recharge times of the electric charge accumulators which cannot drop below 3 hours and an average life of the electric charge accumulators, at least the most performing ones, which does not exceed 100,000 kilometers (after which they must inexorably be replaced, resulting in significant costs to be borne).

But the performance of an electric agricultural machine of known type is most negatively affected by power loss: unlike the accumulators mounted on the latest-generation electric cars, those destined for an electric tractor already begin to lose power after the first recharge.

The heralded autonomy of 4 hours thus becomes very difficult, if not impossible, to achieve after only a few months of use. If 100,000 kilometers in the life of an agricultural tractor can also represent several years of use, power delivery is a somewhat different evaluation parameter and no manufacturer has currently managed to improve performance in this sense, without moreover favorably impacting the reduction of the overall battery pack dimensions.

For a motor of such high power, the dimensions of the battery-powered electric power supply are enormous, substantially unthinkable, as they provide exactly the opposite of the need when working particular agricultural crops, such as vineyards, where the small size of the agricultural machinery is crucial in order to reduce the working times.

Other constructional solutions of electric agricultural driving machinery of the known art, always based on the use of electric charge accumulators, include a vehicle provided with a double electric motor capable of developing a maximum power of 300 kW: in these agricultural machines, still rather problematic during the working of the ground and undoubtedly very expensive, the accumulators (or batteries) are lithium and ensure an autonomy of about 4 hours and 55 kilometers of autonomous travel.

In the agricultural machinery production industry, there are other recent solutions in which the 650 Volt high performance lithium-type accumulator group is more efficient and capable of working for about 5 hours, developing a power of 50 kW; it is thereby possible to build electric-type self-propelled agricultural driving machines which are quite compact, especially due to the excellent reduction of the overall dimensions of the battery pack.

This latest development of electric agricultural machinery is undoubtedly the most advanced design, but more time must pass before the electric tractor becomes a normal investment which a small to medium-sized farm is capable of sustaining.

Parallel to the technological trend which includes the use of electric charge accumulators in the design and construction of electric powered agricultural driving machines, the design of a prototype of a permanent electric powered self-propelled agricultural driving machine has developed in recent years, albeit still at the prototype level and, therefore, still embryonic, obtained by means of a power supply cable connected to the electricity grid, capable of operating in the field in a totally autonomous manner and—at least on paper—of developing a horsepower of about 400.

Indeed, as it is well known, a large part of Italian farms produces electricity independently, for example through biogas or the photovoltaic system, which is fed into the national electricity grid and from there distributed to private homes.

However, passing through cabins and pylons, such clean energy recovered from alternative energy sources can continue the travel thereof to the outskirts of cities, in the open countryside, where it's collected in a central cabin and then passed to an auxiliary service column positioned directly near the ground to be cultivated: thereby, clean energy is made available directly near the field or ground to be cultivated.

In this context, in which the present invention is framed, the innovative, designed, autonomous electric agricultural machine powered by a cable is capable, at least in hypothesis given the prototype status thereof, to exploit the electricity by means of a continuous cable-type power supply, thus eliminating the limited duration of the electric charge accumulators which is causing so many problems, highlighted above, during practical use and also avoiding the forced machine stops to perform recharges or replacements which such accumulators bring.

Particularly, a cable-powered electric agricultural machine currently disclosed in the industry requires a 2,500 V AC power source and uses an electric connection cable which continuously transfers electricity at a power of about 300 kW and through which it's possible to connect the machine itself to the auxiliary service column, present at field edge and connected to the electricity network.

The electric powered agricultural machine in question includes a reference drum (or rotor or winder) installed at the front part thereof, substantially cantilevered with respect to the bearing frame, which houses the electric cable for a predefined length which, again in pure hypothesis, reaches up to 1,000 meters and is configured as an electric coil with a horizontal axis, parallel to the ground.

Once operating in the field, such an electric powered agricultural machine of the known art follows a predefined working pattern, in fully automatic mode, while the electric power supply cable coil is unwound from and rewound onto the reference rotor (or unwinder) with the aid of a robotic support arm, so as to ensure friction-free operation with limited mechanical stress.

The agricultural driving machine of the known art, electrically powered by cable, can also be driven manually by an operator, but remotely using a remote control, a solution which is useful when, for example, the agricultural machine is being maneuvered to start the work at field edge.

Any collisions or physical interference between the structure of the aforesaid electric powered agricultural tractor of a known type and the power supply cable thereof are avoided by an intelligent guide system, based on motion and temperature sensors managed by a central processing and control unit mounted on the machine.

The empty weight of the electric cable powered agricultural machine, of the type belonging to the prior art, is substantially equivalent to the weight of a conventional agricultural tractor, however it is capable of supplying, advantageously, double the power.

In addition to a particularly favorable weight/power ratio, the electric cable powered self-propelled agricultural machine offers the advantages of silent operation and a total absence of harmful gas emissions, in addition to having, as already partially highlighted, about 50% lower production and operating costs than battery-powered agricultural machines.

Nonetheless, the electric cable powered self-propelled driving machines for working a ground just briefly described have some recognized and relevant drawbacks, with a contributing fact being that their design development and field experimentation are still in the embryonic stage.

The main drawback derives from the fact that the wound coil of electric cable is positioned in the front part of the bearing frame of the driving machine and this aspect, in fact, also prevents the application of equipment for working the ground (be it an agricultural field, a lawn of a sports stadium, a public or private garden) in such a front part, possibly simultaneously with the work equipment which is, however, regularly and exclusively applicable to the rear part of the driving machine.

Not even the driving machine of the previous document U.S. Pat. No. 3,632,906 A is exempt from this drawback, neglecting for the moment the constructional conception thereof, evidently overcome by the technological developments which have arisen to date since 1970, to which this document dates back: although in such a document the electric cable coil is substantially arranged in the central part of the bearing frame of the driving machine, there is no indication or practical possibility that the machine U.S. Pat. No. 3,632,906 A is capable of supporting a piece of work equipment in the rear part of the bearing frame, possibly simultaneously with the work equipment applied to the front part of the frame itself.

Inevitably this still reduces, on one hand, the versatility, ductility, or polyvalence of the tractor in question, and on the other hand, the efficiency or productivity thereof in terms of time spent carrying out a given working of a given ground plot.

A second drawback of the electric powered self-propelled machines, generally agricultural, of the known art is that the length of the electric cable must be kept low, and not exceed about 1,000 meters, in order to avoid dangerously unbalancing the vehicle weight towards the front: this limits the width of the field of ground which can be worked with such driving tractor machines, starting from the connecting point of the electric cable to the auxiliary service column at field edge itself.

A further drawback of the electric cable powered self-propelled driving machines, generally agricultural, of a known type is the fact that during the maneuvering step at field edge, at the end of the working of a given band of ground and before starting the working of the next and directly adjacent one, it is necessary to carry out laborious and articulated maneuvers of the vehicle, including reversing, with the negative consequence not only of generating an evident useless waste of time and of reducing the working efficiency, but also of trampling with the vehicle, in particular with the rear wheels thereof, a freshly worked part of the ground and the electric cable itself.

A last but not least drawback of the electric cable powered self-propelled driving machines for working a ground of the prior art is due to the fact that, both because the electric cable coil is mounted in the front part of the bearing frame of such vehicles and for intrinsic construction (seen for example in U.S. Pat. No. 3,632,906 A), it is necessary to couple to the bearing frame itself special and articulated mechanical support and return systems of the electric cable which distance it away from the vehicle, keeping it laterally spaced from the latter's dimensions, especially during the advancement of the vehicle on the ground being worked, to try as much as possible to avoid (without however preventing, as just highlighted) the electric cable from interfering, even getting entangled, with the wheels or with the bearing frame of the vehicle and thereby unfavorably wearing.

Therefore, starting from the awareness of the aforesaid drawbacks affecting the current state of the art concerned here, the present invention aims to effectively overcome such drawbacks.

BRIEF SUMMARY

In particular, it is main purpose of the invention to provide an electric powered self-propelled driving machine for working a ground which allows to mount temporarily a piece of equipment intended for working the ground also in the front part of the vehicle's bearing frame.

In other words, it is thus main purpose of the present invention to devise a self-propelled agricultural machine, with traction or electric power which is more versatile in use than the equivalent machines of known type.

In the cognitive sphere of the aforesaid main purpose, it is the task of the invention to provide a self-propelled driving machine for working a ground, with electric traction or power, which allows to carry out simultaneously several workings on the same ground.

It is a further task of the invention to create an electric powered self-propelled driving machine for working a ground which, as a function of the main purpose set out above, reduces the complete working time of a given ground plot and, in turn, has a better working performance than that of the driving machines of the known art comparable thereto.

It is another purpose of the invention to develop an electric powered self-propelled driving machine for working a ground, generally of agricultural cultivation, which supports or houses a coil of electric cable longer than that paired with similar available or currently proposed driving machines on the market.

Said otherwise, it is a further purpose of the present invention to provide an electric powered self-propelled driving machine which allows to work a ground plot with an area larger than that one which can be worked with similar tractors of known type, thus improving the efficiency thereof even from this point of view, without this being to detriment of the safety conditions of the operator managing the operation thereof.

It's further purpose of the invention to provide an electric powered self-propelled driving machine which simplifies the maneuvers the vehicle must perform at the field edge to pass from the ground band just worked to the next one to be worked.

Within the scope of this purpose, it's also task of the invention to provide an electric powered self-propelled driving machine that minimizes, if not fully avoids, its passage over the part of ground just worked as well as interference with the electric cable also during maneuvers at field edge when the vehicle moves from the ground band just worked to the directly adjacent one to be worked.

It is a last but not least purpose of the present invention to indicate a self-propelled driving machine for working a ground, with traction or electric power, which has a concept simpler constructional than that one of the known tractors.

It is another task of the invention to avoid or at least widely limit the risks of wear of the electric cable with respect to the prior art.

Said purposes are achieved by an electric powered self-propelled driving machine for working a ground according to the attached claim 1, as hereinafter referred for the sake of brevity.

Further technical detail features of the electric powered self-propelled driving machine for working a ground of the invention are reported in the respective dependent claims.

The aforesaid claims, hereinafter specifically and concretely defined, are intended as an integral part of the present description.

Advantageously, the electric powered self-propelled driving machine of the present invention allows to mount temporarily a piece of equipment for working the ground also in the front part of the bearing frame thereof; if required, this simultaneously occurs with a piece of work equipment mounted in the rear part of the bearing frame, with the foresight that the rear equipment and front equipment perform complementary and compatible operations (for instance fertilizing and ploughing, in agriculture).

Preferably but not exclusively, the generally agricultural electric powered self-propelled driving machine for working a ground therefore receives two sets of tools thanks to the front and rear attachments, resulting extremely versatile also for this reason: indeed, it allows ploughing, tilling the ground, preparing the seedbed, sowing and weeding with remarkable precision, simultaneously carrying out two of these processes (for example preparation and sowing of the ground), as long as they are compatible with each other.

This is by virtue of the fact that, in the electric powered self-propelled driving tractor machine for working a ground of the invention, the reference rotor and the electric coil associated therewith (i.e., externally wound thereto), are arranged in the central part of the bearing frame so that both the front part and the rear part of such a bearing frame are free from the front and directly facing the external environment in order to both be able to accommodate removably, and possibly simultaneously, equipment for working the ground.

Therefore, the reference rotor supporting the power supply cable is arranged in the center of the agricultural tractor machine of the invention, allowing operations to be carried out at 360°, ensuring the working continuity and making better use of the power supply cable compared to the driving machines of the prior art, since it is extended or unwound on the ground only to follow the exact length of the ground plot which is being worked on with the tool (or tools).

Equally advantageously, in the driving machine, preferably but not necessarily agricultural, of the invention, the power supply cable always remains at the side of the machine even during the advancement thereof over the ground during the working step, without ever being an obstacle for the same, also potential, to be taken into account in operating conditions.

The electric powered self-propelled driving machine for working a ground of the present invention requires, preferably but not bindingly, an electric power supply ranging from 20 kW to 50 kW in order to operate; the power supply cable of the machine can be connected to a common 380 Volt system, allowing the energy to flow to the agricultural machine of the invention which can thus start working continuously and autonomously, also throughout the day, while an operator remotely supervises the operation thereof.

With the same section of the power supply cable, the electric powered self-propelled driving machine of the invention effectively and safely supports a power supply cable coil which, precisely because it is installed in the center of the bearing frame, has a greater length than that of the power supply cable installed on the equivalent machines of the prior art: this is reflected in the possibility of working without interruption, therefore more efficiently, larger plots of ground than those workable with the known electric powered agricultural tractors.

Advantageously, the electric powered self-propelled driving machine for working a ground of the invention is provided with an unwinder (or first rotation means) cooperating with an electric coil formed by a power supply cable having a length of over 1,000 meters, up to even 1,500 meters.

As a reference, in case the power supply cable has a length comparable to that one of the power supply cables mounted on the electric powered driving machines of known type, the positioning thereof in the central part of the bearing frame, as occurs in the machine of the invention, advantageously allows to design a power supply cable with a section (i.e., diameter) wider than that one of similar machines of the prior art, thus obtaining, on one hand, the transfer of greater electric power since the electric current conducted is greater, and on the other hand, a limitation of the overheating and wear thereof.

In the invention, the electricity flows along the power supply cable, passes through the initial section of the distribution arm and arrives in the coil positioned at the center of the agricultural machine where it operates two electric motors, each having, preferably, the 44 kW of power and air-cooled, and form the "beating core" of the agricultural machine itself: through speed variation means, the epicyclic gears that regulate the power of the two electric motors are actuated, allowing the speed of the tractor machine of the invention to be adapted to the type of working which must be performed, significantly increasing the precision and effectiveness of the machine itself.

For heavy agricultural work such as ploughing and tillage, speed of the self-propelled driving machine of the current invention can reduce to 500 m/h (which corresponds to 200 rpm of the two motors), while for lighter agricultural work such as sowing, sanding and/or fertilization, the self-propelled driving machine of the invention reaches up to 6 Km/h (corresponding to 1,480 rpm of the two motors).

In addition, the electric powered self-propelled driving machine of the present invention is preferably provided with GPS technology which allows it to program its movements in a precise manner, creating a map of the ground to be worked.

Furthermore, the GPS system allows the electric powered agricultural machine of the invention to always keep the position of the power supply cable under control, even while it is being unwound in the field.

Still advantageously, the receiver of the GPS system is positioned at the central support turret, more precisely inside the reference rotor, and therefore at the center of the tractor machine of the invention and allows the latter to independently determine the path to follow, know at any time the position of the power supply cable, adjusting the movement of the distribution arm accordingly and, if the equipment—such as a fertilizer spreader—it supports contains a product to be dispersed on the ground and it progressively loses weight precisely because during the working this product is spread on the ground, constantly update the center of gravity thereof to maintain stability during the advancement of the agricultural machine and/or during the maneuvering of the equipment at the edge of the field.

As soon as it reaches the edge (or limit or margin) of the field, the electric powered self-propelled driving machine for working a ground of the invention changes the direction of travel: in fact, the hydraulic part of the machine comes into action, which first raises the tool, or even tools (in the case of front tool and rear tool), with which it is working the ground and then lowers an anchoring (or lifting) platform (or plate) which, thereby, enters in contact with the ground, discharging a large part of the weight of the agricultural machine of the invention to the ground.

At that point, the bearing frame and the kinematic mechanisms of the self-propelled tractor of the invention are rotated by 90°, for example clockwise, and, once the anchoring or lifting platform is raised, the agricultural machine moves towards the next longitudinal band of ground to be worked—for a traversal section corresponding to the width of the tool with which the ground is being worked—, where the platform itself is lowered again and the frame carrying the kinematic mechanisms rotated by a further 90° always in the same direction of the previous rotation (for example clockwise).

The anchoring (or lifting) platform is then raised and falls within the overall dimensions of the bearing frame of the agricultural machine of the invention and the tool (or tools, if one is installed in the front and one in the rear) are lowered: the electric powered self-propelled driving machine of the invention is thus ready to resume the work thereof, rewinding in the central part, in total safety, the power supply cable through the distribution arm.

Preferably, the electric powered driving machine is further provided with motion and temperature sensors which allow the identification of any obstacles present on the advancement path of the agricultural machine itself: in the remote but not totally avoidable case of collision with an obstacle (such as an animal), the operator remotely controlling the agricultural tractor machine receives a signal, for example on his smartphone, and possibly also a video of the situation which has arisen in the work field, by virtue of the detection means, such as a video camera, with which the machine of the invention is provided.

Equally advantageously, the usually agricultural self-propelled driving machine of the present invention is state-of-the-art, sustainable and producible at a competitive cost; by virtue of the use of GPS technology and reduced forward speeds, through the invention it is possible to obtain greater precision in fundamental workings such as, for example, sowing and weeding: thereby, the use of fertilizers and herbicides is limited with respect to the known technique, resulting in economic savings and environmental benefits.

Moreover advantageously, although preferred, the multi-functionality of the generally agricultural electric powered self-propelled driving machine of the invention makes it suitable and adaptable to different types of crops and also makes it perfect for the market, given the complex biodiversity of the workable territory to produce raw materials for the food industry.

Choosing an electric power supply means reducing the emissions of polluting gases, noise, and maintenance, even in the field of agricultural machinery for working the ground: in consideration of the fact that 40% of the territory of the European Union is used for agricultural purposes, through the electric powered self-propelled driving machine of the invention, the environment and the resulting food excellence are protected.

BRIEF DESCRIPTION OF THE DRAWINGS

Said purposes and advantages will be more evident from the following description, related to a preferred embodiment of the electric powered self-propelled driving machine for working a ground of the present invention, given by way of indicative and non-limiting example, with reference to the attached drawings, in which.

DETAILED DESCRIPTION

First of all, for the sake of completeness, it should be noted that in agricultural mechanics an agricultural tractor, to which the present invention refers preferably, belonging to the family of self-propelled agricultural machines, is considered a "driving machine", while the agricultural equipment carrying out the work on the ground pulled by such a tractor (such as the plough or the grubbing machine) or hooked to the power take-off thereof (such as the fertilizer spreader, the harrow, the tiller or the weeder) are defined as "operating machines".

Figure 1:
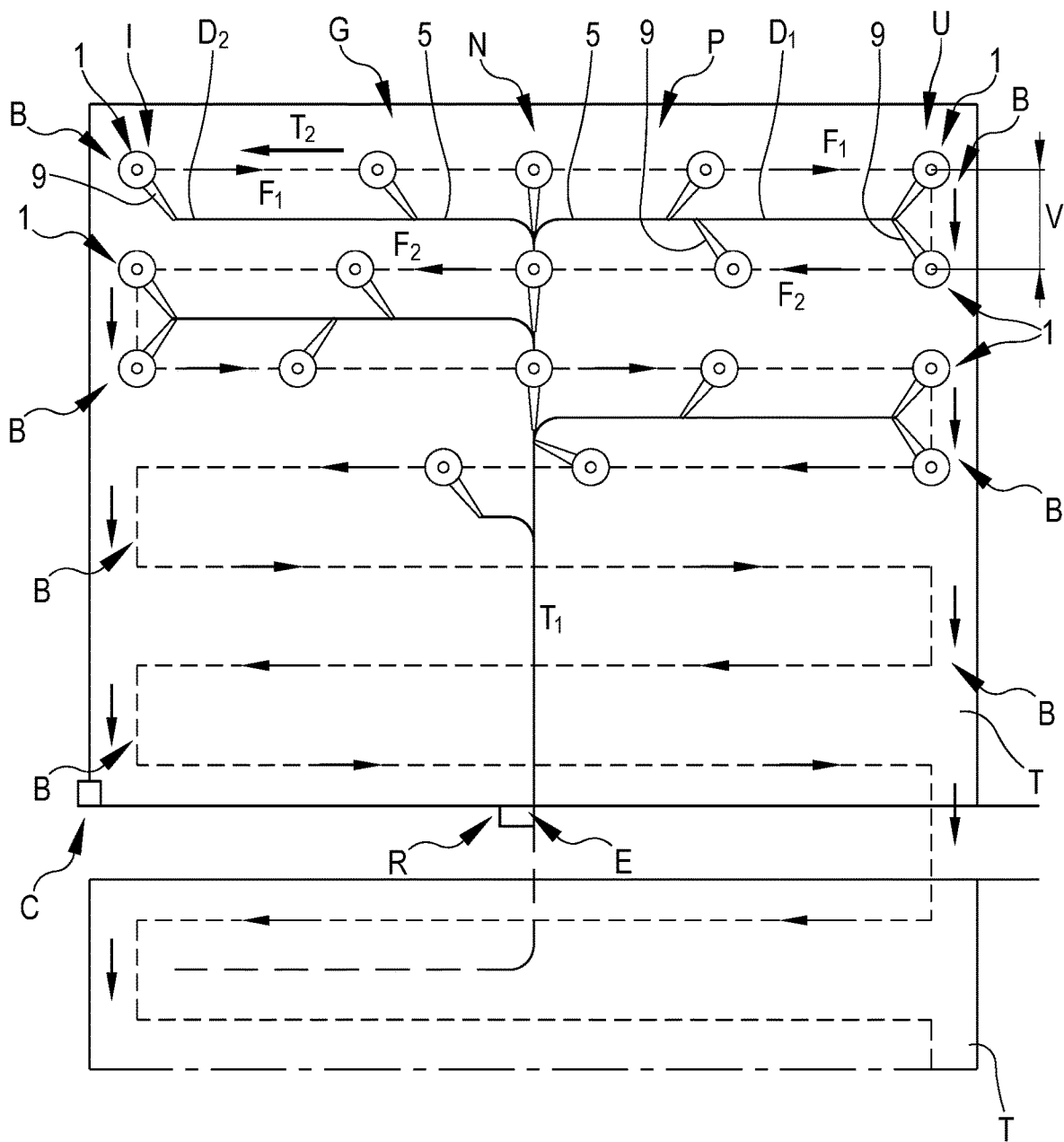
FIG. 1 is a diagrammatic plan view of the system for working a ground plot carried out by the driving machine of the invention.

The self-propelled driving machine of the invention, useful for working a ground, such as an agricultural field by exploiting an electric power supply without any aid from electricity accumulators, is shown in FIGS. 2-6 where it is globally numbered with 1, while FIG. 1 diagrammatically shows the mode of operation, while it is working the ground.

Figure 4:
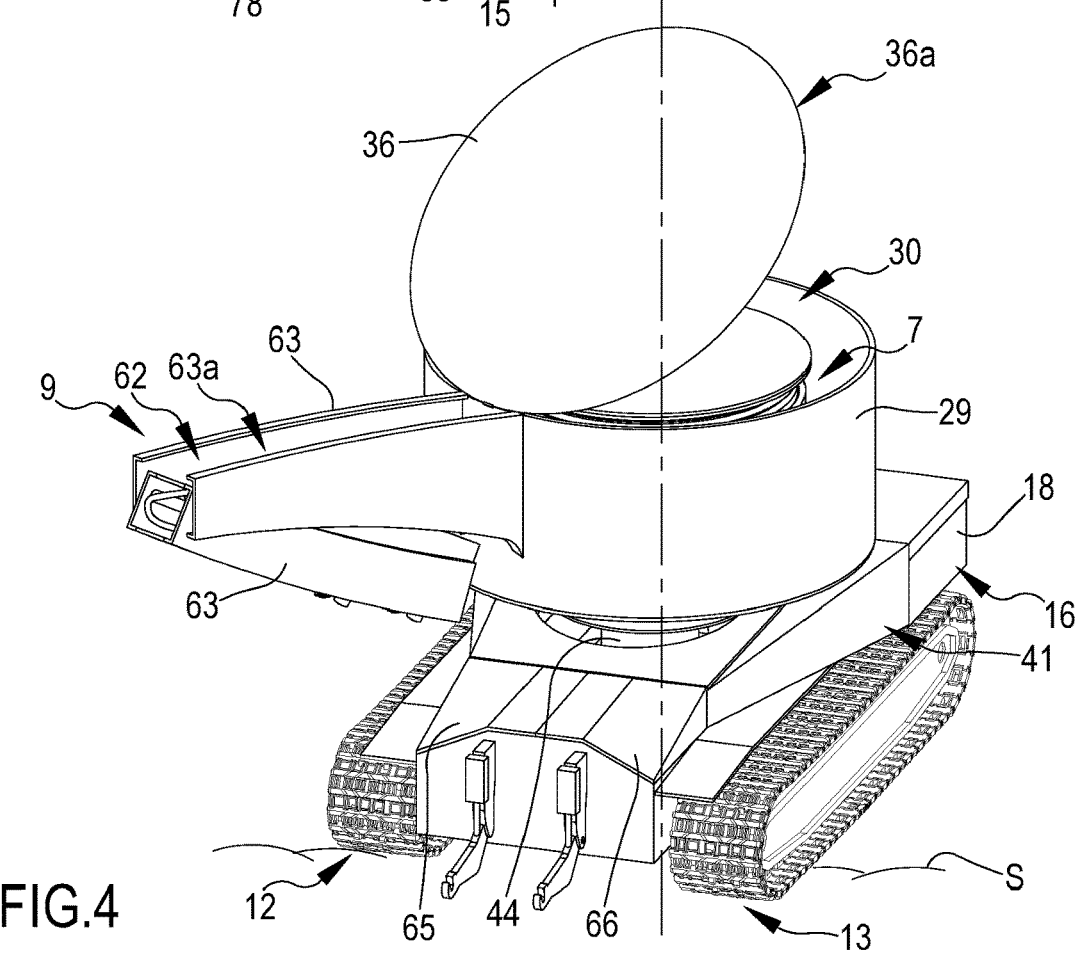
Figure 5:
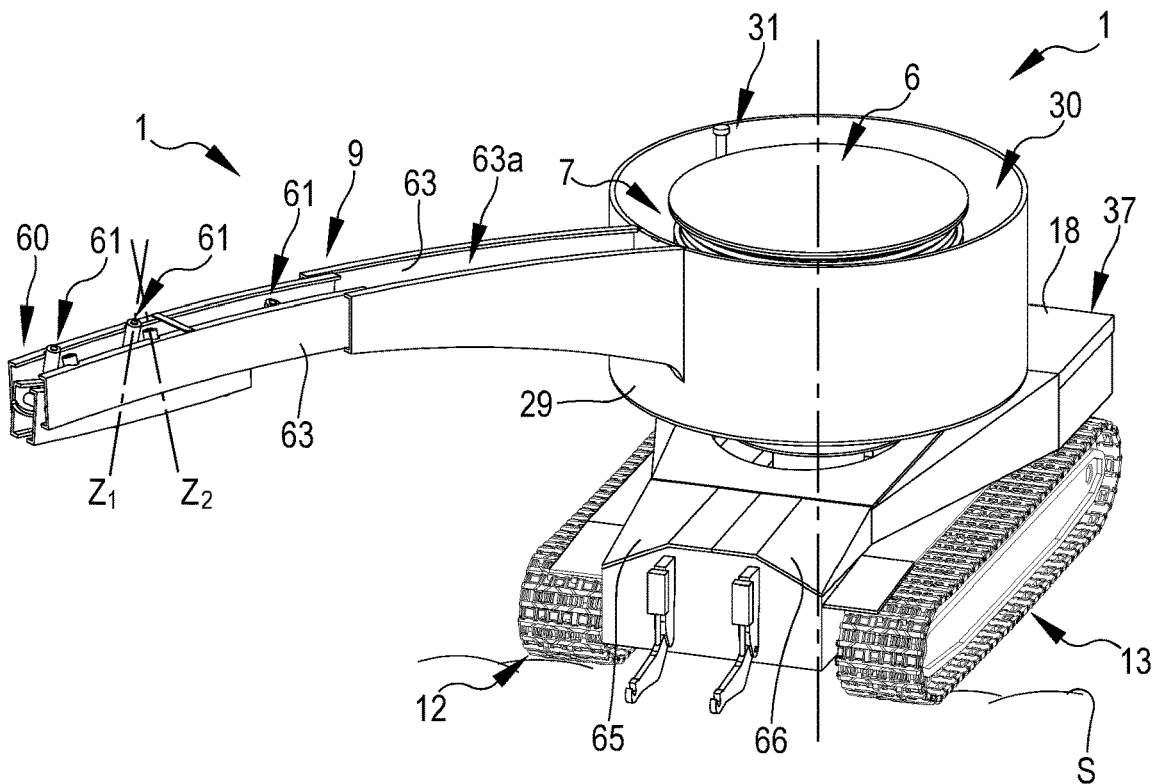
FIGS. 5 and 6 are two distinct assonometric views of the self-propelled driving machine of the invention in non-operating conditions (i.e., with the distribution arm in the operating position, facing—for example—the front of the machine)
Figure 6:
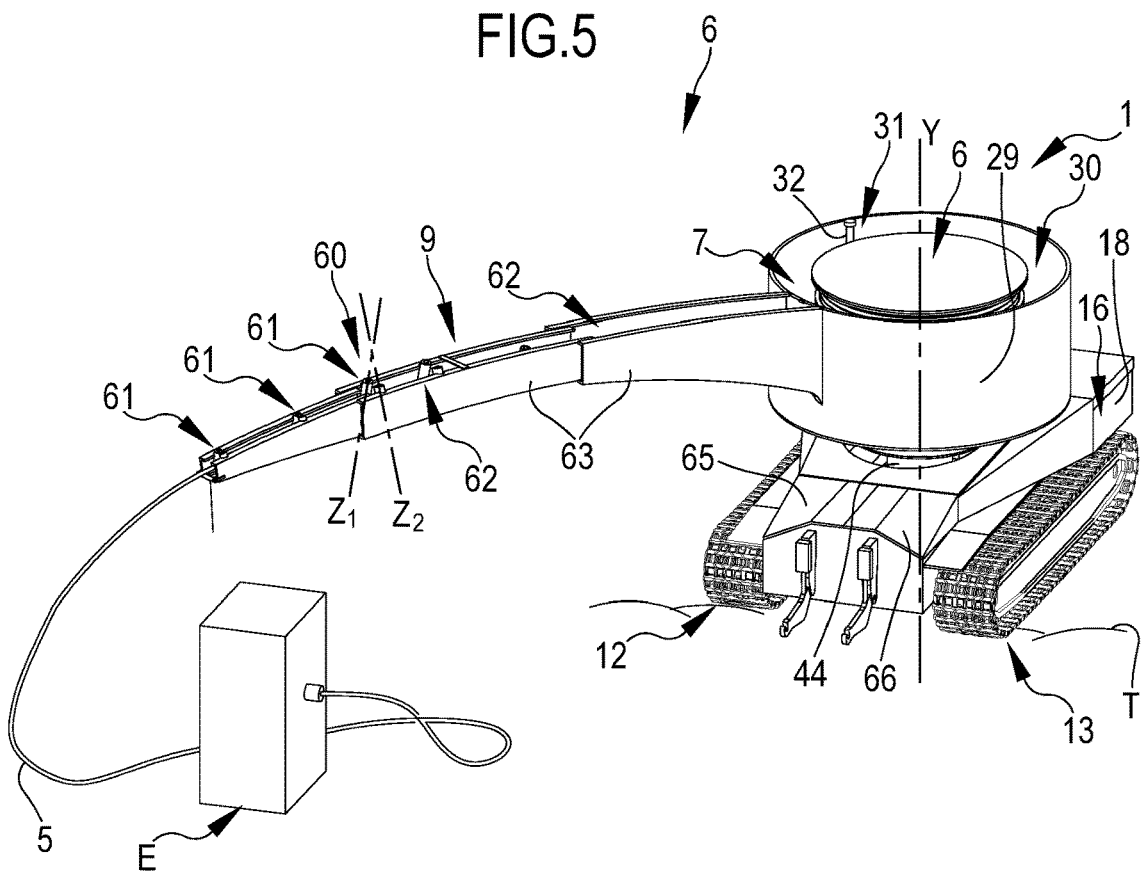
Figure 10:
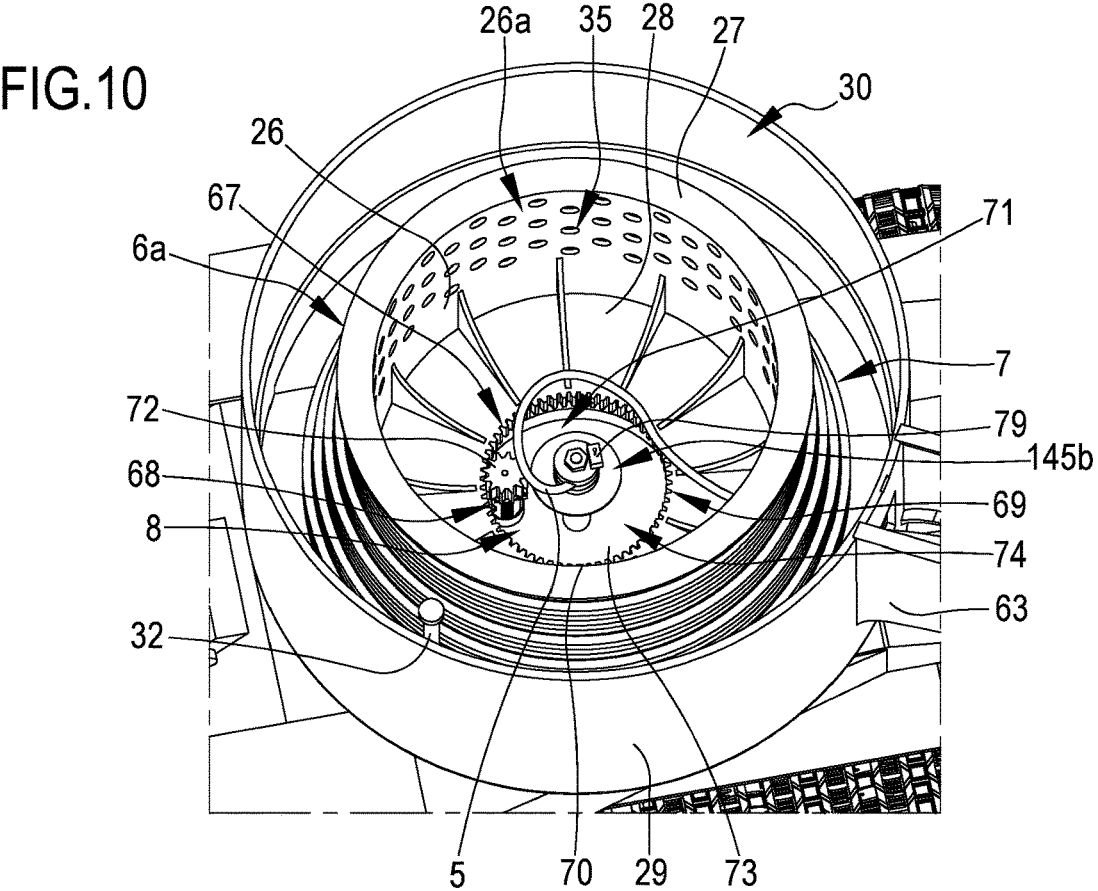
FIG. 10 is a first truncated and simplified assonometric view, from an elevated position, of the central part of the machine of FIGS. 2-6.

As it can be seen, the driving machine 1 comprises:

- a bearing frame 2 adapted to remain, when the machine 1 is assembled, at a given distance from a reference surface S, such as not only, typically, a ground T to be worked, but also the road (asphalted or not) traveled, the body of a means of transport and so on;
- kinematic mechanisms (or means for transmitting the force or traction to the ground), indicated overall with 3, coupled to said bearing frame 2 and adapted to be arranged close to the reference surface S (or ground T in this case) when the machine 1 is assembled and in use conditions;
- electric motorization means, indicated overall with 4, coupled to the bearing frame 2 and operatively connected to the kinematic mechanisms 3, adapted to be electrically operated (by means of electric current coming from an electric power source such as an auxiliary service column E connected to a power station C and, for example, arranged at the edge B of the plot P of the ground T to be worked) to move the bearing frame 2;
- a power supply cable 5 adapted to be electrically connected to the electric motorization means 4 and to be connected to the electric power supply source E;
- a reference rotor 6 around which the power supply cable 5 is wound to form an electric coil 7 of predefined length, coupled to said bearing frame 2 and operatively connected to first rotation means, overall numbered 8 and seen in FIGS. 10 and 4, adapted to be operated to unwind/rewind the power supply cable 5 from/onto the reference rotor 6 at least during the advancement of the driving machine 1 for carrying out a working on the ground T;
- a distribution arm 9, operatively connected to the bearing frame 2 and supporting the power supply cable 5 so as to at least limit the interference thereof with the kinematic mechanisms 3 during the advancement of the driving machine 1 on the ground T while it is being worked.

According to the invention, the reference rotor 6, and the electric coil 7 wound thereon, are arranged in the central part 2a of the bearing frame 2 so that both the front part 2b and rear part 2c of the bearing frame 2 themselves are frontally free and directly facing the external environment in order to accommodate, removably and, specifically simultaneously, both pieces of equipment $L_1$ (in this case a harrow) and $L_2$ (in this case a subsoiler with roller) for working the ground T.

More particularly and more precisely, the reference rotor 6 and the electric coil 7 wound thereon are always arranged at the weight gravity center defined by the bearing frame 2 and by the equipment (or tools) $L_1$, $L_2$ for working the ground T removably installed on the bearing frame 2 itself; this therefore even when, in operating conditions, the product contained in (at least one) piece of work equipment—obviously different from those shown in the accompanying figures—mounted on the driving machine of the invention is progressively consumed, as it is spread on the ground T for the cultivation of the latter.

This technical feature is a significant advantage for the stability of the electric powered self-propelled driving machine 1 of the invention, with respect to that offered by the known art, of which U.S. Pat. No. 3,632,906 A is a typical example.

In this case, moreover, the reference rotor 6 preferably defines a vertical rotation axis Y around which the electric coil 7 is wound/unwound during the advancement of the driving machine 1 on the ground T.

However, it is understood that in other executive solutions of the driving machine of the invention, for simplicity not accompanied below by reference figures, the reference rotor can define a horizontal rotation axis around which the electric power supply cable coil is wound/unwound during the advancement of the driving machine on the ground: this variant is particularly suitable for electric powered self-propelled driving machines with a width of no more than 3.5 meters.

It should also be noted that, in order to operate on the ground T, the driving machine 1 of the invention requires an electric power supply—supplied by the electricity grid and made available to the auxiliary service column E located at the edge B of the plot P of the ground T to be worked—having an electrical power in the range 20÷50 kW and a voltage of 380 Volts.

It should also be added that at the auxiliary service column E, the value of the electric current is raised to 700 Volts by means of convenient electric current transformers to allow the design and construction of a power supply cable 5 with an adequately reduced section, more contained with respect to that otherwise required.

In a preferred but non-binding manner, the self-propelled driving machine 1 of the present invention also comprises a central processing and control unit (such as a PLC, not seen in the accompanying figures), installed in a control panel 10 arranged in a technical room 11 made in the bearing frame 2 (preferably at the front part 2b thereof) and normally closed by a pair of laminar doors 65, 66 hinged to the bearing frame 2 and operable by the operator to access inside the aforesaid technical room 11.

The central processing and control unit is electrically connected to the electric power supply source E and, moreover, it manages the actuation and operation at least (although not only, as will be deduced from what is indicated below) of the electric motorization means 3 and of the first rotation means 8.

Advantageously but not exclusively, the kinematic mechanisms 3 comprise a pair of tracks 12, 13 opposite to each other which are symmetrically arranged with respect to a longitudinal axis X according to which the bearing frame 2 is mainly articulated from a constructional point of view and each extend along a respective linear direction X', X" parallel to such a longitudinal axis X.

Each of such tracks 12, 13 comprises, as per constructional praxis, a modular chain 14 provided with rigid ridges (or blocks or grooves) 15 monolithic thereto and made of metallic material of high mechanical strength, such as steel, thus being particularly suitable for more invasive working of the ground T—especially in the agricultural industry where the ground T is moreover uneven or irregular—, where therefore a greater adherence of the tracks 12, 13 and a significantly reduced resistance to advancement (or rolling friction) is required.

Alternatively, in other executive variants of the driving machine of the invention, not shown below, each of said tracks comprises a modular chain provided with rigid monolithic ridges and made of elastomeric material of high mechanical strength, particularly suitable for working said ground in the civil, private and/or residential field.

Preferably but not necessarily, the electric motorization means 4 include a pair of electric motors 16, 17 arranged in the rear part 2c of the bearing frame 2 and symmetrically with respect to the longitudinal axis X of the latter just defined above.

By way of preferred example, each of such electric motors 16, 17 is of the type with about 45 kW (so that the driving machine 1 develops a total power of about 120 HP) and is arranged above a respective of the tracks 12, 13.

More in detail, each of the electric motors 16, 17 is contained in a box-shaped protective body 18 which is arranged above each of the tracks 12, 13 and has the function of physically isolating the electric motors 16, 17 from the external environment, thus avoiding that any person, even those responsible for the works, accidentally and dangerously come into contact with said electric motors 16, 17 when the machine 1 is in use conditions or in any case available for use, for example in a farm shed.

Figure 7:
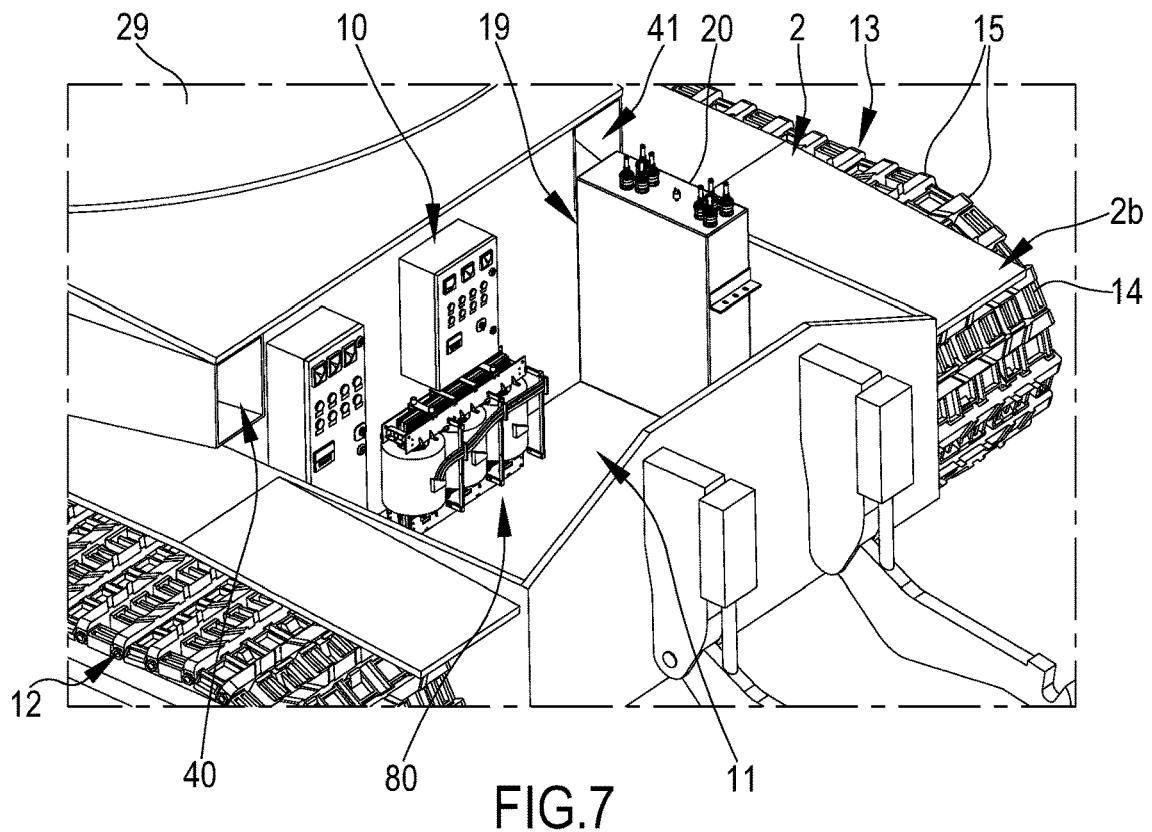
FIG. 7 is a truncated and simplified assonometric view of the front part of the machine of FIGS. 2-6.

In an appropriate but purely preferred manner, the electric motorization means 4 electrically cooperate with electric current conversion devices, indicated as a whole with 19 and seen in greater detail in FIG. 7, adapted to:
- stand between the electric power supply source E and the electric motorization means 4;
- be operated in a differentiated manner in such a way as to rotate at least the kinematic mechanisms 3 and the bearing frame 2 and, in general, also the work equipment $L_1$, $L_2$ by an angle of 180° when the machine 1 of the invention, having completed the working of a longitudinal band $F_1$ of a plot P of ground T (see FIG. 1), reaches the edge B of such a plot P of ground T, and to place the driving machine 1 of the invention in the position useful to start the working of the next and directly adjacent longitudinal band $F_2$ of the plot P of ground T.

In particular, the electric current conversion devices 19 comprise a pair of inverters, only one of which is seen in the accompanying figures where it is indicated with 20, contained into the technical room 11 defined in the bearing frame 2: each of such electric current conversion devices 19 is electrically connected, on one side, to the central processing and control unit which manages the operation thereof, and, on the other side, to a respective electric motor 16, 17.

Moreover, the electric current conversion devices 19 of the type included in the invention also have the function of reducing the intensity of the electric current coming from the auxiliary service column E positioned at the edge B of the plot P of the ground T.

With specific reference to the electric motorization means 4, they are operatively connected to the kinematic mechanisms 3 by means of, preferably:
- speed variation means, indicated overall with 21 and clearly visible in FIGS. 9, 14-16, contained in the inner part of the bearing frame 2;
- motion transmission means, not shown in the accompanying figures for simplicity, contained in the inner part of the kinematic mechanisms 3.

In the structural assembly thereof, the speed variation means 21 and the motion transmission means are suitable to vary the advancement speed of the driving machine 1 of the invention on the ground T according to the type of work to be carried out on the ground T itself.

In particular, the rotation speed of the electric motors 16, 17 is made to vary from about 200 rpm to about 1,500 rpm, which corresponds to an advancement speed of the driving machine 1 of the invention on the ground T which varies from 500 m/h to 6 Km/h: this is based on the frequency impressed by the central processing and control unit introduced above.

Purely preferably but not bindingly, the speed variation means 21 comprise, for each of the electric motors 16, 17, a V-belt 22 closed in a ring, and a pair of pulleys 23, 24, spaced apart from each other and having rotation axes parallel to each other, in the annular groove 25 of which the aforesaid V-belt 22 is engaged in a variable position, according to speed requirements.

The motion transmission means comprise a pair of cyclic gears (or gearings), also known as planetary and satellite gears and used for changing speeds in vehicles, one for each of the tracks 12, 13.

In relation to the power supply cable 5, it is of the three-phase type and has a diameter between 38 and 45 mm, preferably 42 mm: the constructional expedient related to these values of the diameter of the power supply cable 5 contributes, together with other expedients highlighted in the rest of the description, to avoid dangerous and harmful overheating.

Specifically, the power supply cable 5 advantageously has a length varying between 1,000 meters—particularly suitable for a smaller version of the driving machine 1 of the invention, provided with tracks made of elastomeric material, such as rubber, and with which it is possible to perform works on plots P of ground T of approximately 100 hectares, for example mowing the grass of a football field—and 1,500 meters—particularly suitable for a larger version of the driving machine 1 of the invention, provided with tracks made of metallic material, such as steel, and with which it is possible to perform works on plots P of ground T of approximately 225 hectares, for example ploughing and fertilizing agricultural ground—.

As far as the reference rotor 6 is concerned, it is supported by a structural assembly 74 belonging to the bearing frame 2 and arranged in particular in the central part 2a of such a bearing frame 2.

Figure 11:
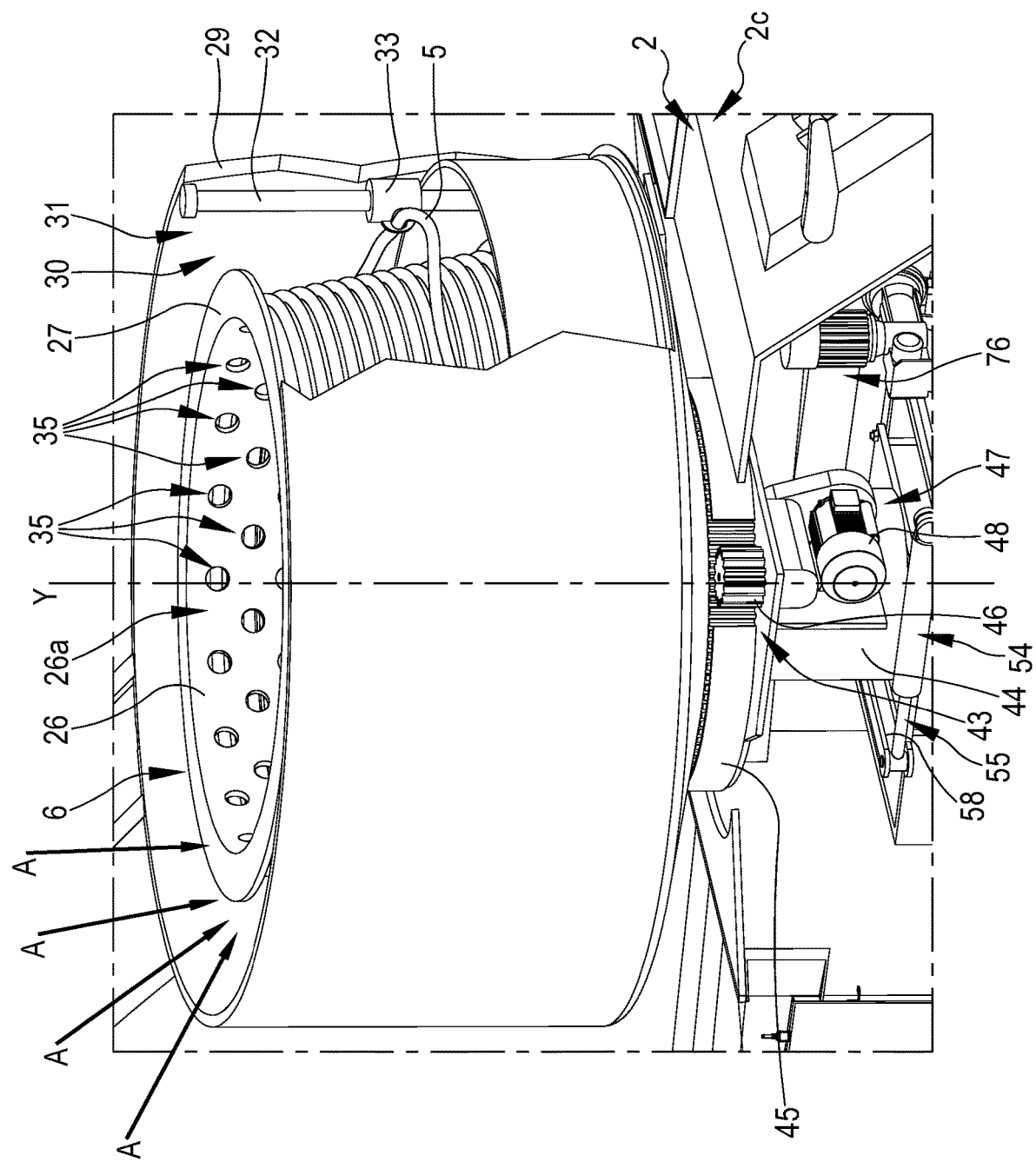
FIG. 11 is a second truncated and simplified assonometric view, from a side position, of the central part of the machine of FIGS. 2-6.
Figure 12:
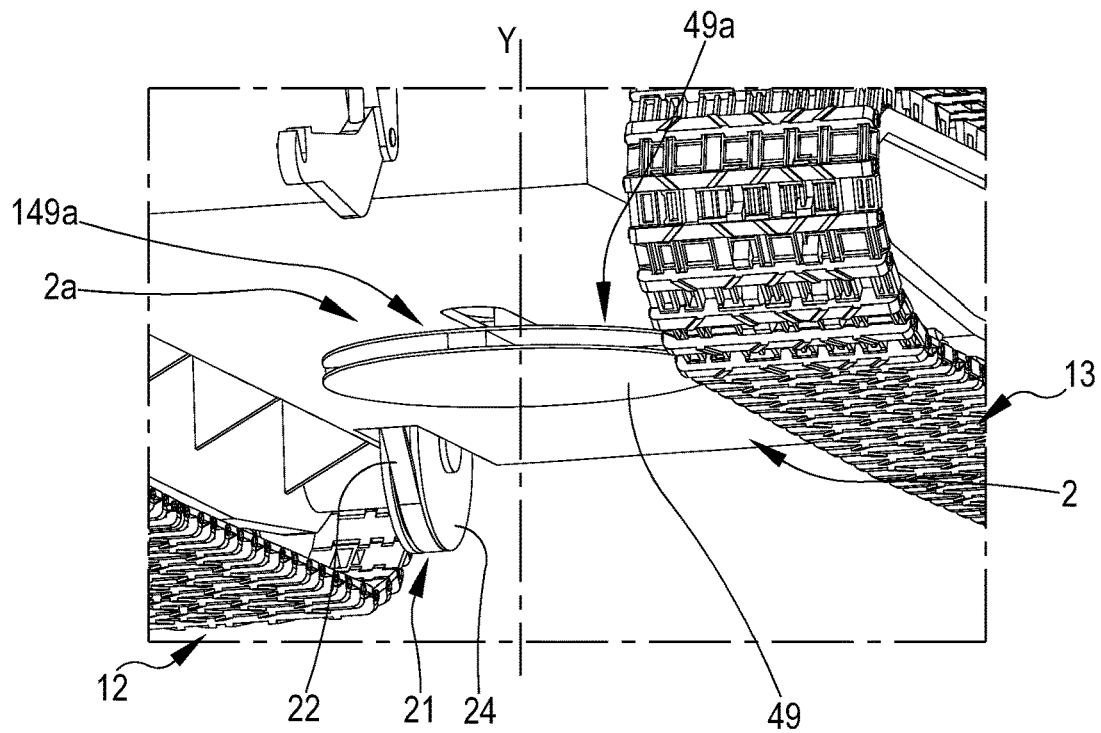
FIG. 12 is a first truncated assonometric view of the lower part of the machine of FIGS. 2-6, in the operating position it takes during travel on the ground, on the road or while it is being transported.
Figure 13:
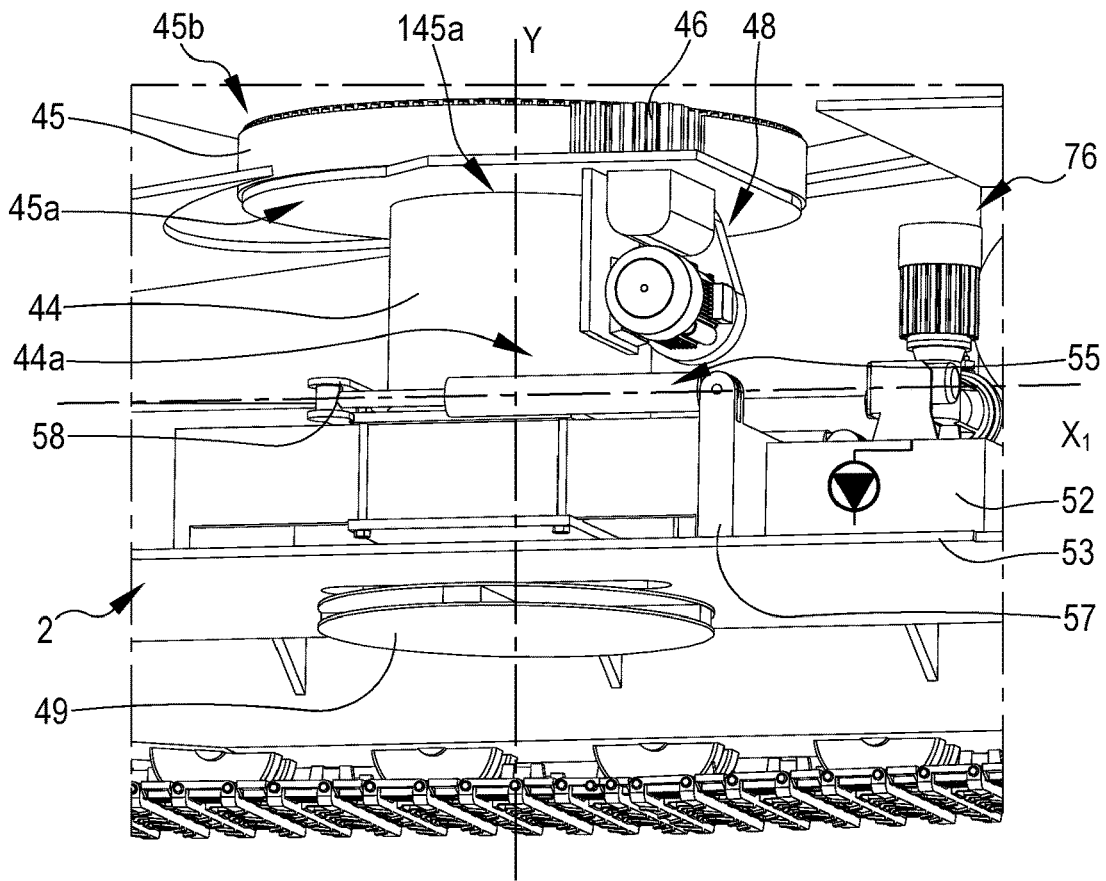
FIG. 13 is a second truncated and simplified assonometric view of the lower part of the machine of FIGS. 2-6, in the operating position it takes during travel on the ground, on the road or while it is being transported.
Figure 14:
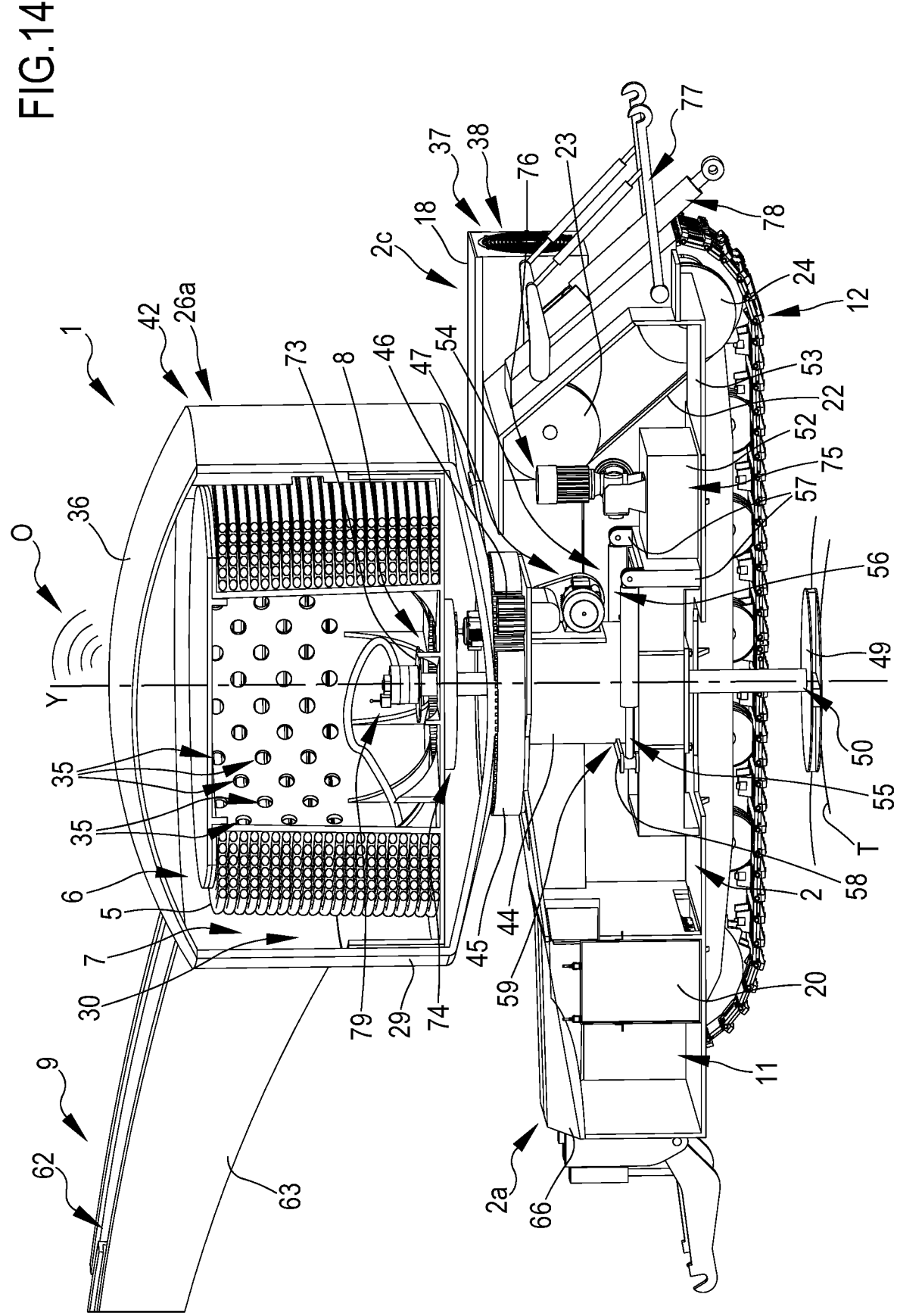
FIG. 14 is a truncated, simplified, partially cut-away assonometric view of the machine of FIGS. 2-6, in the operating condition it takes at field edge, at the end of the working of a longitudinal band of ground plot and before turning around to start working the adjacent longitudinal band of the ground plot.
Figure 15:
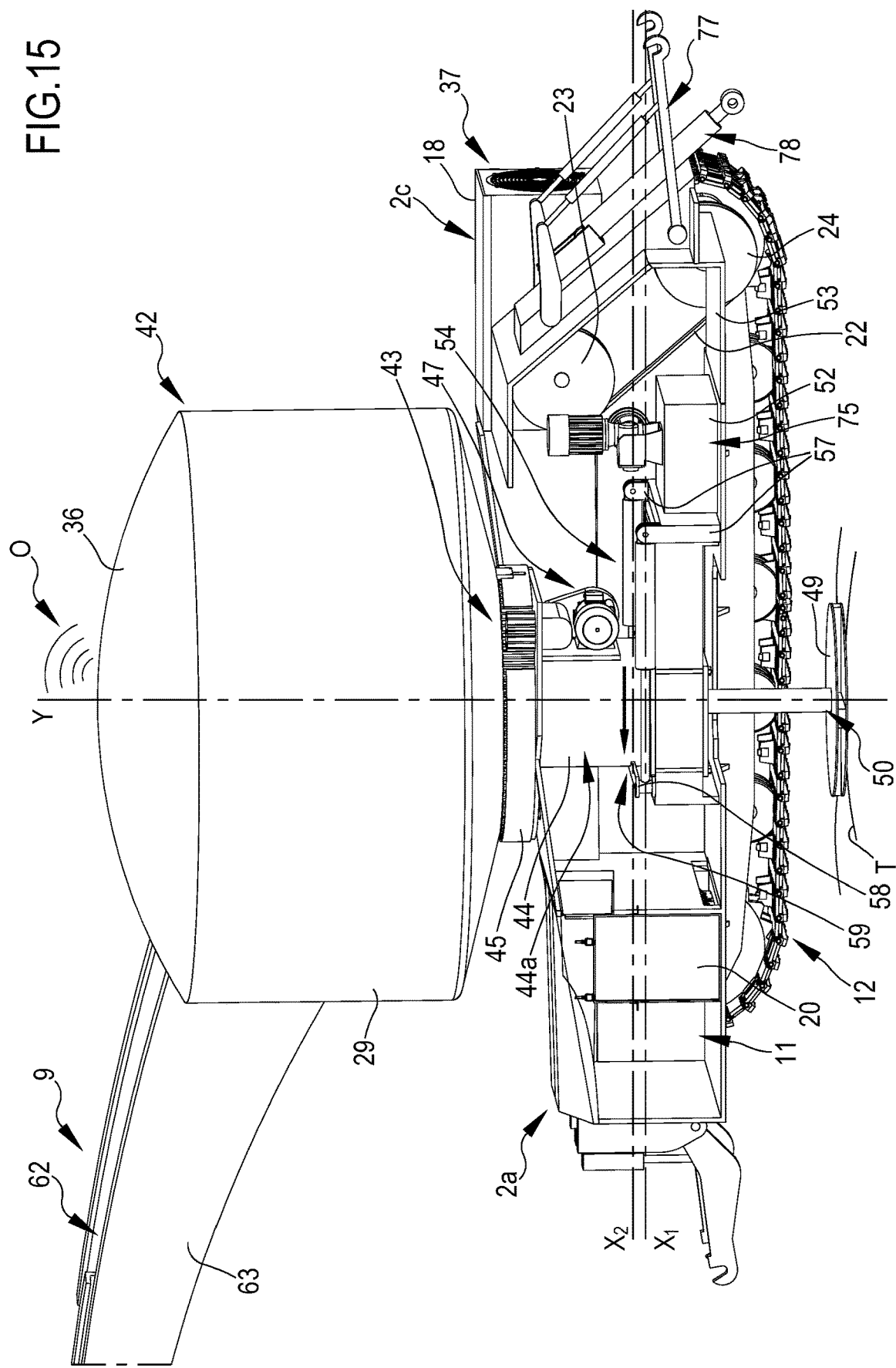
FIG. 15 is a truncated, simplified, partially cut-away assonometric view of the machine of FIGS. 2-6, in operating condition, distinct from that one of FIG. 14, which it still takes at field edge, at the end of the working of a longitudinal band of ground plot and before turning to start working the adjacent longitudinal band of ground plot, if the work equipment mounted on the machine of the invention spreads product on the ground.
Figure 16:
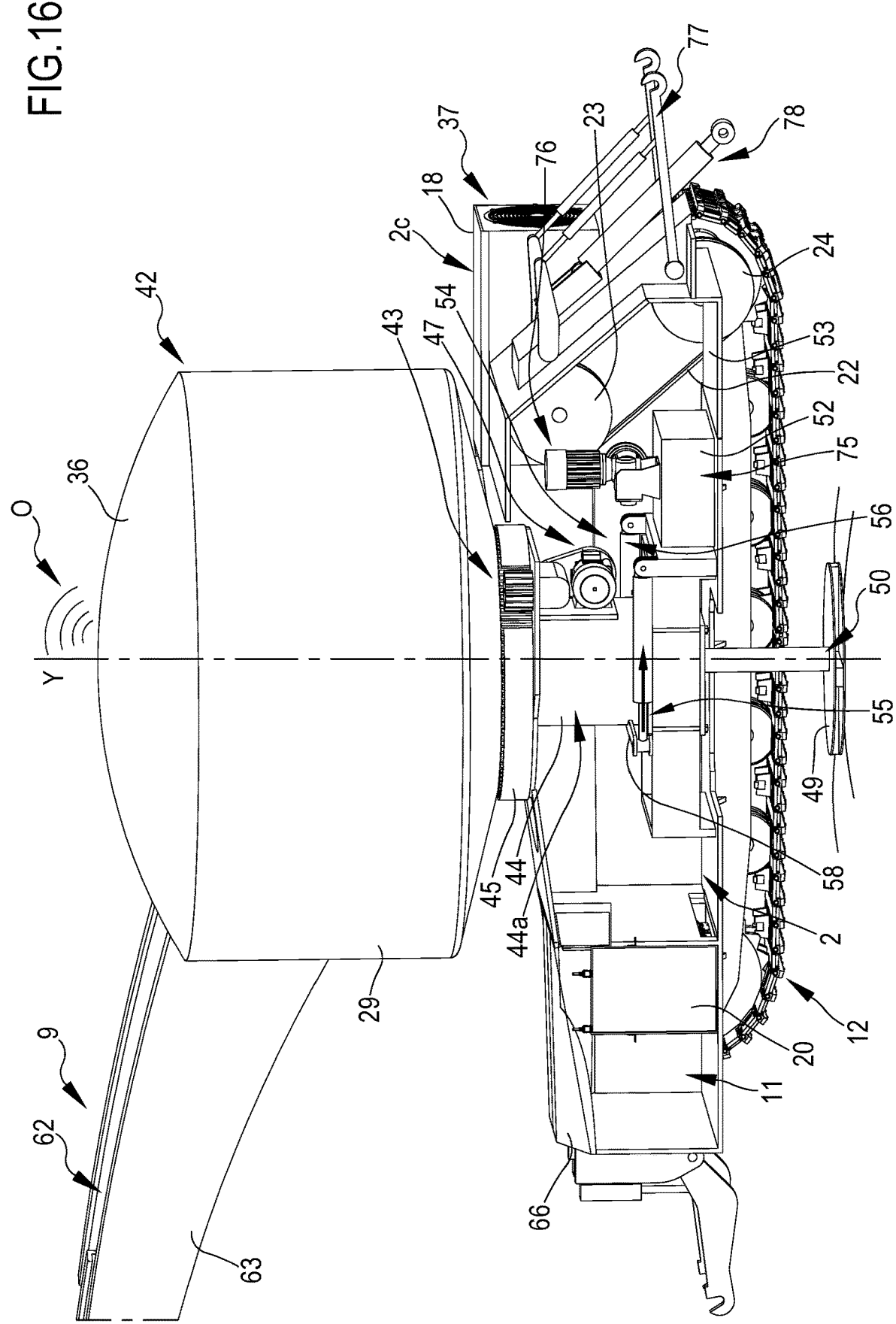
FIG. 16 is a truncated, simplified, partially cut-away assonometric view of the machine of FIGS. 2-6, in operating condition, distinct from that of FIGS. 14 and 15, which it still takes at field edge, at the end of the working of a longitudinal band of ground plot and before being turned to start working the adjacent longitudinal band of ground plot, always if the work equipment mounted on the machine of the invention spreads product on the ground.

More in detail, as shown in FIGS. 10, 11 and 14, the reference rotor 6 includes, preferably but not exclusively, an internally hollow cylindrical drum 26, provided with side containment flanges 27, 28 and having a frusto-conical or tapered shape along the linear rotation axis Y defined by the reference rotor 6: this expedient has the double significant advantage, on the one hand, of winding the power supply cable 5 outside the cylindrical drum 26 without overlapping some of the sections thereof and, on the other hand, to prevent that when the driving machine 1 is stationary, for example stored in a shed on a farm or in a garage or in a shed of a private house, the power supply cable 5 wound on the cylindrical drum 26 decants or slides down where it would cluster in a disordered manner.

In addition, the cylindrical drum 26 has a dimensional extension in height and width such as to help avoid dangerous and harmful overheating of the power supply cable 5 while it is wound/unwound onto/from a side wall 26a of the cylindrical drum 26.

For example, the internally hollow cylindrical drum 26 of the reference rotor 6 presents, advantageously although purely preferred, a height in the range 900÷1,100 mm (preferably equal to 1,000 mm), an internal diameter in the range 1,100÷1,300 mm (preferably equal to 1,200 mm) in the widest part, and an internal diameter in the range 900÷1,100 mm (preferably equal to 1,000 mm) in the narrowest part.

These dimensional values are suitable for helping avoid dangerous and harmful overheating of the power supply cable 5 while it is wound/unwound onto/from the side wall 26a of the cylindrical drum 26, when the power supply cable presents a length of 1,500 m and the driving machine 1 of the invention is configured, for all intents and purposes, as an agricultural machine used for working fields destined to produce crops.

In case the electric powered self-propelled driving machine of the invention is configured as a machine for less heavy work—which can be carried out in the field of gardening, do-it-yourself, urban care or public or private structures such as the field of a stadium—the internally hollow cylindrical drum of the reference rotor will continue to have a tapered shape but will have lower values than those indicated above, having to support an electric power supply cable coil of shorter predefined length: in this case, the height of the cylindrical drum will be in the range 200÷400 mm (preferably equal to 300 mm) and have an internal diameter in the range 700÷900 mm (preferably equal to 800 mm) in the widest part.

The reference rotor 6, as mentioned rotated to unwind/wind the power supply cable 5, is also coaxially housed inside a central support turret 29 coupled to the bearing frame 2 and defining with the aforesaid reference rotor 6 an inner annular chamber 30 partly occupied by the power supply cable 5 and adapted to allow the passage of clean air A coming from the outside.

Preferably but not necessarily, the driving machine 1 of the invention comprises distribution means, as a whole numbered with 31 and visible in FIGS. 10, 11 and 14, contained into the inner annular chamber 30 and coupled externally to the reference rotor 6 or internally to the central turret support 29, cooperating with the supply cable 5 to advantageously distribute it in a uniform and orderly manner on the side wall 6a of the reference rotor 6, according to a tapered configuration which leaves the inner annular chamber 30 at least partly free.

The distribution means 31 comprise, for example, an endless screw 32 which is arranged vertically in the inner annular chamber 30 and in which an internally threaded adjustment block 33 progressively engages, while the power supply cable 5 is unwound/wound from/onto the reference rotor 6.

It should be underlined that, from a constructional point of view, the inner volume 34 of the central support turret 29 advantageously communicates with the technical room 11 of the bearing frame 2 through suitable structural slots (not visible in the accompanying figures) defined among the inner components of the driving machine 1 of the invention, as well as, in turn, such a technical room 11 conveniently communicates with the electric motorization means 4.

It should be emphasized that, conveniently and advantageously, but not limitingly, the side wall 6a of the reference rotor 6 (or better, in the specific case, the side wall 26a of the cylindrical drum 26) presents a plurality of through openings 35 adapted to allow the passage of clean air A coming from the outside.

In particular, if required or necessary for the operating conditions of the driving machine 1 during the working of the plot P of ground T, the clean air A, entering from above and in the central part of the machine 1 itself, firstly cools the power supply cable 5 which, by induction, inevitably tends to overheat while being wound/unwound from/onto the reference rotor 6; from here the clean air A, passing through the through openings 35 and the inner volume 34 of the reference rotor 6, conveniently enters inside the bearing frame 2, cooling the other sensitive components as well, as will be more apparent from what will be briefly highlighted.

The suction of the air A carried out from above, while the driving machine 1 advances on the ground T to carry out the related working thereof, offers greater guarantees in terms of purity (and, therefore, effectiveness of use) of the air compared to a suction of the same air carried out frontally or behind the bearing frame 2 of the driving machine 1, where the air would inevitably be at least partially contaminated by the dust raised by the driving machine 1 itself and by the working equipment $L_1$, $L_2$ which it supports.

Figure 2:
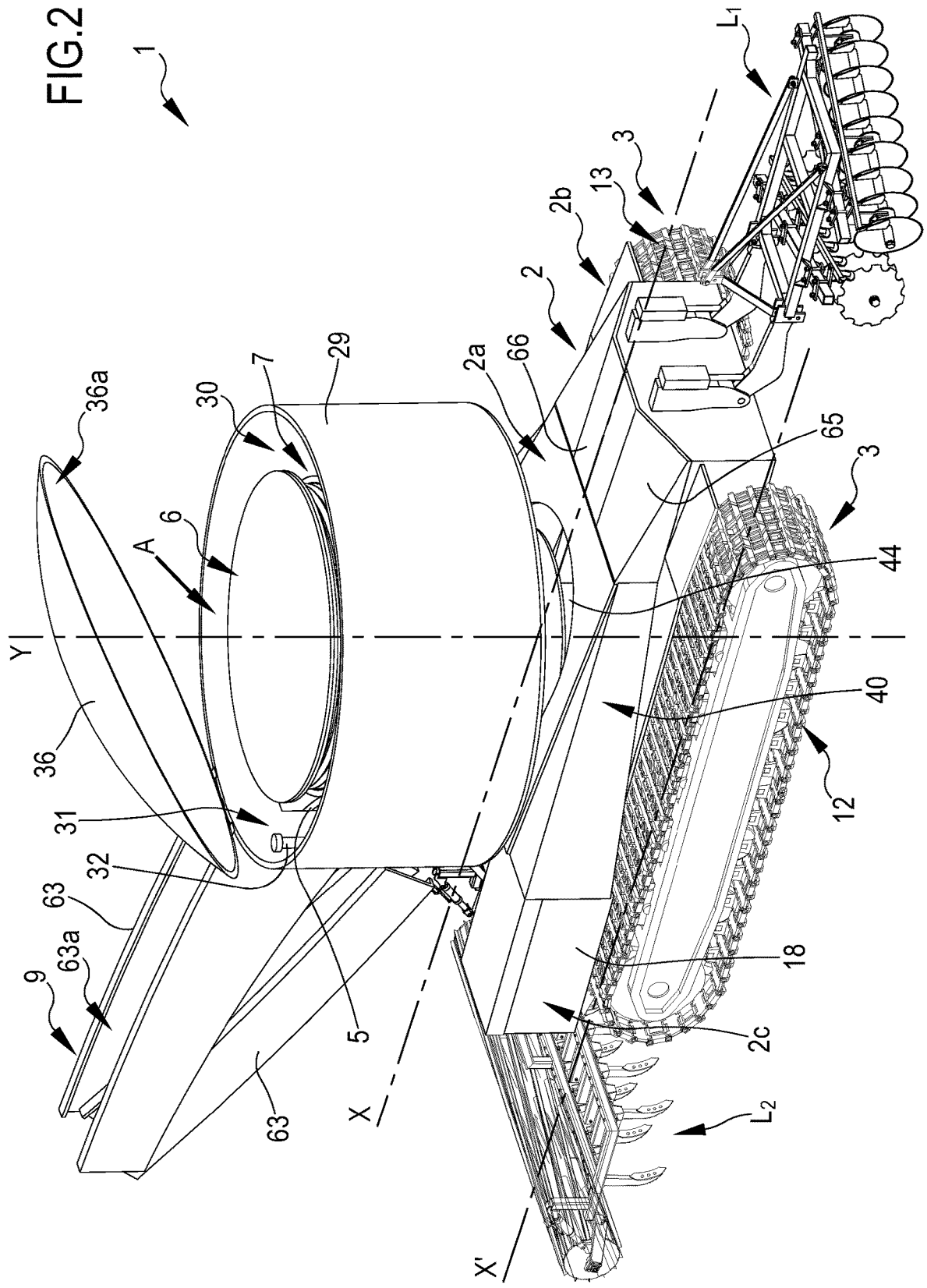
FIGS. 2-4 are three distinct assonometric views of the self-propelled driving machine of the invention in non-operating conditions (i.e., with the distribution arm in the rest position, protruding from the rear part of the machine, when for example it is transported and/or travels along a road)

By way of non-limiting advantage, the reference rotor 6 is also provided with a covering dome 36, seen in FIGS. 2, 4 and 14-17, protruding annularly (for about 5 cm) from an outer edge 6b of the reference rotor 6 to allow clean air A to enter the inner annular chamber 30; the covering dome 36 is suitable for being moved, for example by means of hydraulic actuators (not shown for brevity), between a normally taken closed position (seen in FIGS. 14-17) and a temporarily taken open position (seen in FIGS. 2 and 4).

Preferably but not exclusively, the covering dome 36 has a convex shape and is provided externally with lighting means, not shown in the accompanying drawings, adapted to be activated during the night operation of the driving machine 1 of the invention to signal the presence thereof.

Figure 3:
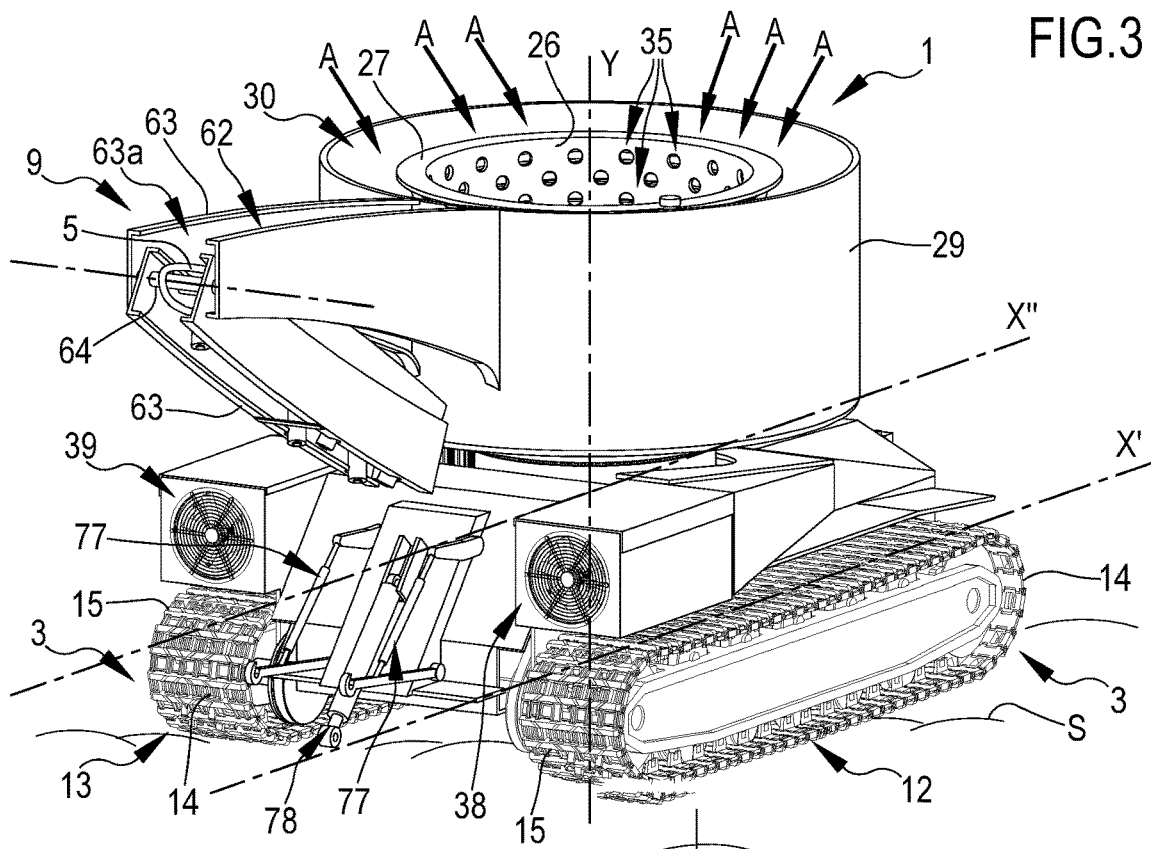
Figure 8:
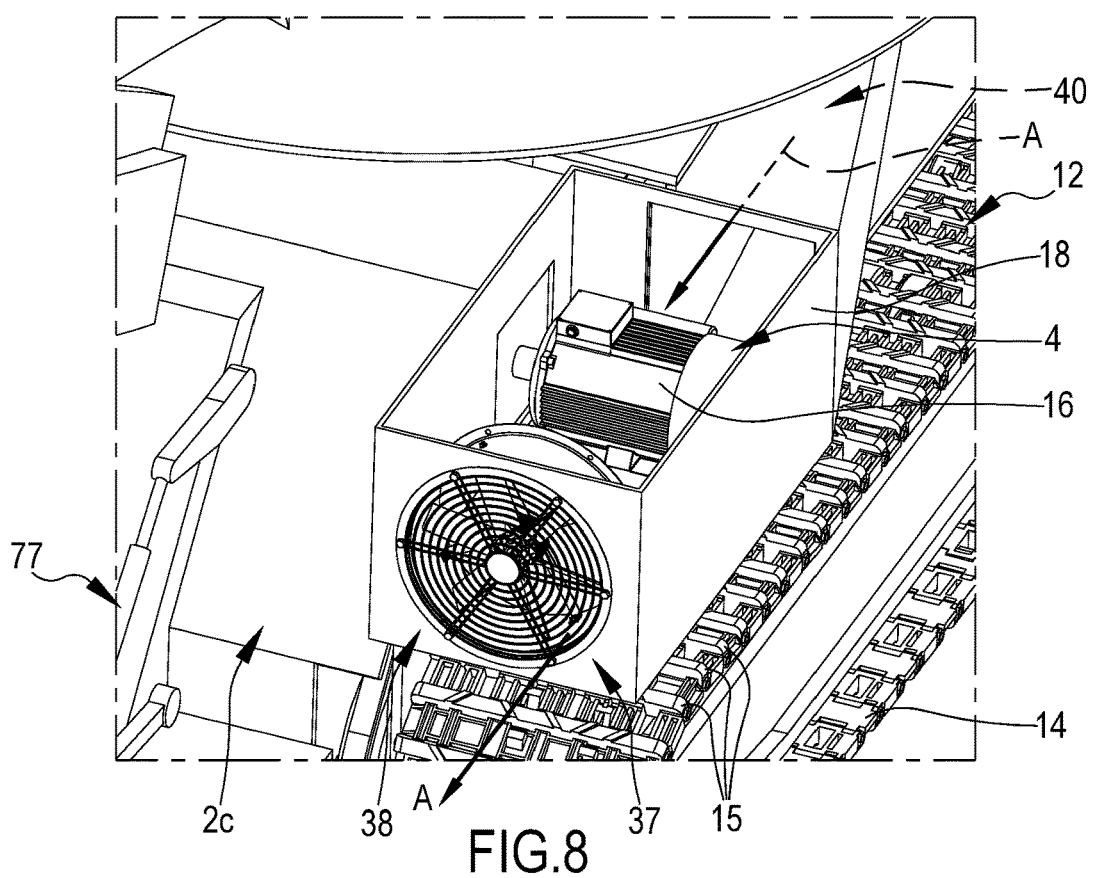
FIG. 8 is a first truncated and simplified assonometric view of the rear part of the machine of FIGS. 2-6.
Figure 9:
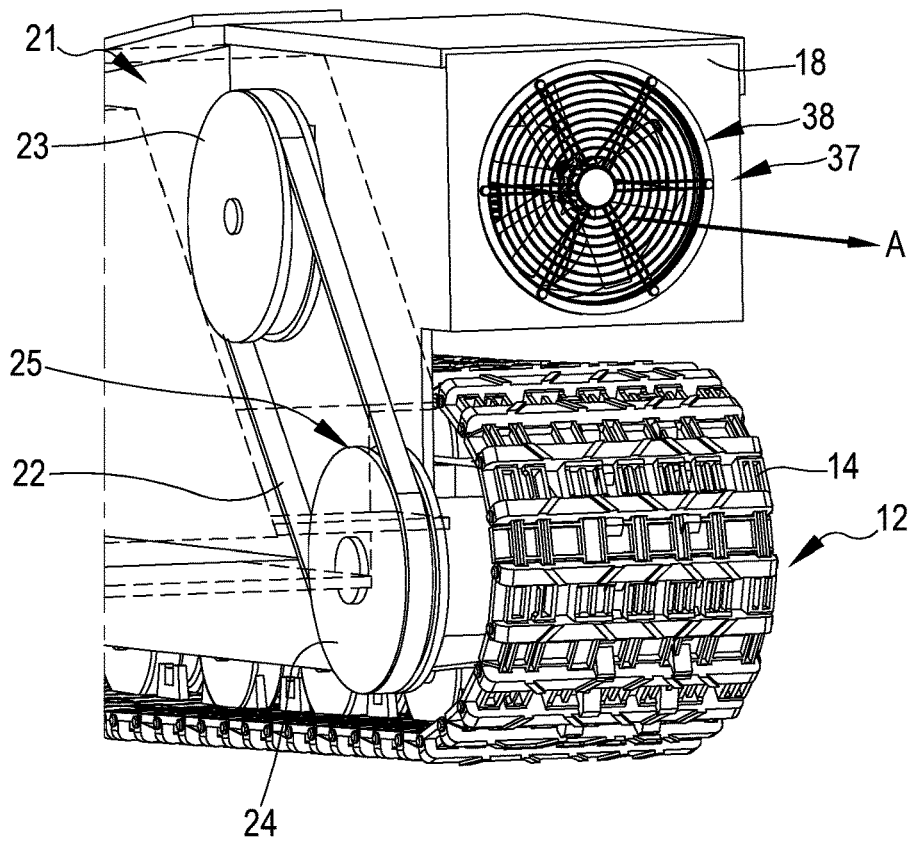
FIG. 9 is a second truncated and simplified assonometric view of the rear part of the machine of FIGS. 2-6.

FIGS. 3, 8 and 9 highlight that, preferentially, the driving machine 1 of the invention also comprises pneumatic suction means, indicated overall with 37, coupled to the bearing frame 2 near the electric motorization means 4, adapted to be operated to suck in the clean air A coming from the outside from above, making it circulate inside the bearing frame 2 to obtain the result of cooling the components subject to overheating.

In the specific case, the pneumatic suction means 37 are electrically connected to the central processing and control unit which manages the operation thereof and comprise, for example, a pair of axial fans 38, 39, each of which:

contained into the box-shaped protective body 18;

on one side facing towards the outside and on the opposite side facing towards one of the electric motors 16, 17 which transfer the driving force of the driving machine 1;

communicating with the technical room 11 through a pair of side channels 40, 41 opposite to each other defined in the bearing frame 2 laterally to the central support turret 29 and symmetrically with respect to the longitudinal axis X of the bearing frame 2 itself.

Advantageously but without limitation, the axial fans 38, 39 are operatively connected to temperature sensors, not shown, electrically connected to the central processing and control unit and adapted to enable the actuation of the axial fans 38, 39 (by the central processing and control unit) when a prefixed temperature threshold value inside the bearing frame 2 is exceeded.

In essence, therefore, when the operating conditions of the self-propelled driving machine 1 of the invention require it during the working of the plot P of ground T, the central processing and control unit actuates the pneumatic suction means 37 which suck clean air A from the top of the central support turret 29, drawing the same clean air A through the substantially annular interspace 42 defined between the outer edge 29a of the central turret 29 and the inner edge 36a of the covering dome 36 and determining the conveyance thereof through, in the order:

the inner annular chamber 30 of the central support turret 29;

the technical room 11 of the bearing frame 2;

the side channels 40, 41 of the bearing frame 2;

the box-shaped protective body 18 of the bearing frame 2, and thus obtaining the benefit of cooling the power supply cable 5, the electronic service devices (such as the control panel 10 and the inverters 20) mounted in the technical room 11 and the electric motors 16, 17 of the electric motorization means 4, before exiting towards the outside from the rear part 2c of the bearing frame 2 of the driving machine 1 of the invention.

According to the preferred embodiment of the invention described here, the central support turret 29, from which the distribution arm 9 protrudes and through which the distribution arm 9 itself is coupled to the bearing frame 2, is coupled by second rotation means, numbered overall 43, to a tubular element 44 (seen in FIGS. 4-6 and 14-17) coupled to the bearing frame 2 and coaxial to the reference rotor 6 and to the central turret 29.

In particular, the second rotation means 43, integral with the tubular element 44, preferably comprise:
- a first gear wheel 45 interposed between the central turret 29 and the tubular element 44;
- a second gear wheel 46, having a diameter smaller than the diameter of the first gear wheel 45 in which it engages, operatively connected to auxiliary electric motorization means, indicated overall with 47 and integral with the tubular element 44, electrically operated to cause rotation of the central turret 29, and therewith of the distribution arm 9, clockwise and counterclockwise, when the driving machine 1, at the edge B of a plot P of the ground T, moves between a just-worked longitudinal band $F_1$ of the plot P itself and a next and directly adjacent longitudinal band $F_2$ to be worked of the plot P.

This constructional expedient has the advantage of keeping the power supply cable 5 distanced from the bearing frame 2 and from the work equipment $L_1$, $L_2$ of the driving machine 1 of the invention, avoiding that the power supply cable 5 hinders the movement of the kinematic mechanisms 3 or negatively interferes with the latter during the maneuvers at the edge B of the field, as well as arranging the power supply cable 5 in the correct position useful to start the subsequent working of the longitudinal band $F_2$ directly adjacent to the one just worked (band $F_1$).

It should be noted that even the auxiliary electric motorization means 47 are electrically connected to the central processing and control unit and include, for example, an electric motor 48 of the low voltage type, such as a brushless motor.

As can be seen in FIGS. 12-17, the self-propelled driving machine 1 of the present invention advantageously further comprises a lifting or anchoring platform (or plate) 49, preferably having a continuous profile, for example circular, a full structure (without recesses, carvings, or points of structural discontinuity) and identifying a horizontal plane; the lifting platform 49 is coupled to the first gear wheel 45 by means of first actuation means, indicated overall with 50, and adapted to be operated to arrange the lifting platform 49 selectively between:
- a raised position (see FIGS. 12 and 13), taken not only during the advancement of the driving machine 1 for working the ground T but also during the normal transport or simple transfer travel thereof, in which the lifting platform 49 falls within the vertical overall dimensions of the kinematic mechanisms 3;
- a lowered position (see FIGS. 14-17), taken when the driving machine 1, having finished working the longitudinal band $F_1$ of said plot P of ground T, reaches the field edge B of the plot P, in which the lifting platform 49 protrudes from the vertical overall dimensions of the kinematic mechanisms 3 until it interferes in a planar manner with the ground T, anchoring itself to this and lifting or uncoupling from the ground T at least the bearing frame 2, the kinematic mechanisms 3, the central support turret 29 and, if required, the work equipment $L_1$, $L_2$ to allow the subsequent rotation by at least an angle of 90° of the bearing frame 2, of the kinematic mechanisms 3 and possibly, as normally occurs, of the work equipment $L_1$, $L_2$.

More specifically, the first actuation means 50 comprise a first hydraulic cylinder 51 operating along a vertical axis, coinciding in this case with the linear rotation axis Y of the reference rotor 6, fixed to the central point 145a of a lower face 45a of the first gear wheel 45 (which can also be defined as fifth wheel) and at the central point 149a of an upper face 49a of the lifting platform 49 and hydraulically connected to an oil tank 52 coupled to a reinforcing base 53 belonging to the bearing frame 2 and positioned at the rear part 2c of the latter.

The actuation of the lifting platform 49 in the lowered position therefore allows the rotation at the field edges B of the bearing frame 2, the kinematic mechanisms 3 and, therewith, of the work equipment $L_1$, $L_2$, during the working of the plot P of ground T, without the kinematic mechanisms 3 being negatively dragged on the ground T in this maneuver, thus conveniently avoiding the invasive, almost destructive interference of the kinematic mechanisms 3 against the ground T, also just worked, at the field edges B.

The rotation at the field edge B exclusively of such components of the self-propelled driving machine 1 of the invention, once the working of a longitudinal band of the plot P of ground T has been completed, occurs, as already highlighted above, by actuating the electric current conversion devices 19 which allow the rotation of the bearing frame 2 and of the kinematic mechanisms 3 around the linear axis Y first by an angle of 90° and then, after a short movement of the driving machine 1 along a transversal section V equal to the width of the work equipment $L_1$, $L_2$, by a further 90° angle.

Preferably but not exclusively, the tubular element 44 supporting the central support turret 29 is coupled to the bearing frame 2 by means of second actuation means, overall indicated with 54, adapted to be operated:
- firstly when the driving machine 1, having finished working said longitudinal band $F_1$ of the plot P of ground T, reaches the edge B of such a plot P of ground T;
- necessarily in presence of work equipment $L_1$, $L_2$ which, while working the ground T, spreads product (for example fertilizer) on the ground T, gradually losing weight, to horizontally slide the central support turret 29, the reference rotor 6 and the electric coil 7 wound thereon (but also the lifting platform 49 integral with the central turret 29), up to the updated position, progressively variable during said working, of the weight gravity center defined by the bearing frame 2 and by the equipment $L_1$, $L_2$ for working the ground T.

Such horizontal sliding of the just-cited components (central support turret 29, reference rotor 6, electric coil 7 wound thereon and lifting platform 49) forms an example of a constructional expedient, totally absent in the prior art (see document U.S. Pat. No. 3,632,096 A for instance), by which the reference rotor 6 and the electric coil 7 are kept wound thereon always at the weight gravity center defined by the bearing frame 2 and by the equipment $L_1$, $L_2$ for working the ground T, advantageously conferring stability to the driving machine 1 of the invention and safety both for the structural integrity thereof and for the operators who can gravitate around it.

More particularly, the second actuation means 54 comprise, in this preferred case, a pair of second hydraulic cylinders 55, 56, each of which operating along a horizontal axis $X_1$, $X_2$ and fixed to a protruding support bracket 57 and to a transversal reinforcing bar 58 of the bearing frame 2 coupled (for example by junction means such as a welding seam 59) also to an external wall 44a of the tubular element 44.

Each of the second hydraulic cylinders 55, 56 is also hydraulically connected to the oil tank 52 present in the reinforcing base 53 of the bearing frame 2.

The arrangement of a pair of second hydraulic cylinders 55, 56 operating according to horizontal axes $X_1$, $X_2$ parallel to each other (clearly seen in FIGS. 11 and 14-16) allows obtaining a fairly balanced and precise horizontal stroke— having a maximum value of about 60 cm—of the tubular element 44 and therewith of the central support turret 29.

Nevertheless, alternative variants of the electric powered self-propelled driving machine of the invention, not shown below, may include that the second actuation means comprise a number of second hydraulic actuators different from that just described, this number being able to vary according to the constructional choices starting from one.

The advantageous and innovative horizontal sliding of the central support turret 29, of the reference rotor 6 and of the electric coil 7 wound thereon to re-calibrate the weight gravity center of the driving machine 1 of the invention always occurs towards the part of the driving machine 1 itself in which the weight is greater, considering the fact that the weight gravity center of the latter, in operating conditions, is a function of the weight and position (front or rear) of the mounted work equipment (or, as in the case just described, of the weight of the work equipment $L_1$, $L_2$ mounted at the front and rear), and of the consumption of product deriving from the working of the ground T, if at least one piece of work equipment (such as a fertilizer spreader) plans to spread product on the ground T, thus progressively losing weight.

However, during the working of a ground T, the optional horizontal sliding of the central support turret 29, of the reference rotor 6 and of the electric coil 7 wound thereon occurs if and only if the only work equipment mounted or at least one of the two pieces of work equipment $L_1$, $L_2$ mounted on the bearing frame 2 gradually loses weight.

It should be noted that the actuation of both the first actuation means 50 and the second actuation means 54 is also managed by the central processing and control unit installed in the electrical panel 10 arranged in the technical room 11 which can be inspected.

With specific reference to the distribution arm 9, it should be highlighted that it supports the power supply cable 5 slidingly through convenient sliding means, overall indicated with 60, contained within the overall dimensions of the distribution arm 9.

Preferably but not limitingly, the sliding means 60 include a plurality of idle rollers 61 made of low friction coefficient material (for example a polymeric material such as PTFE, PET, POM, PEEK, combinations thereof and the like), two by two facing each other and spaced apart so as to define a longitudinal channel 62 for the passage of the power supply cable 5 within the overall dimensions of the distribution arm 9.

In an advantageous but not binding manner, the idle rollers 61 are arranged two by two so as to define linear directions $Z_1$, $Z_2$ converging each other in order to prevent the accidental and inconvenient separation of the power supply cable 5 from the distribution arm 9.

Preferably but not exclusively, the distribution arm 9 is of the foldable type, being divided into a plurality of shaped portions 63 having an inner volume 63a communicating with the external environment; each of such shaped portions 63 is coupled to the adjacent one having greater dimensions through a rotation hinge 64 adapted to arrange said distribution arm 9 alternately in:
  an operating position, taken when the driving machine 1 of the invention is in operating conditions, in which the distribution arm 9 extends to the maximum length thereof and the shaped portions 6e are arranged aligned in sequence with one another;
  a rest position, taken when the driving machine 1 of the invention is in non-operating conditions or during transport to reduce the size thereof, in which the distribution arm 9 has a shorter length than the maximum length and at least two of the shaped portions 63 (see FIG. 5) are arranged one partially and rotatably retracted into the other one directly adjacent thereto.

In general, however, in the rest position, the distribution arm 9 has the minimum length, shown for example in FIGS. 3 and 4, and each of the shaped portions 63 is partially and rotatably retracted into the other one directly adjacent thereto, so as to minimize the overall dimensions of the distribution arm 9, for example during transport or while it is stored in a farm shed.

According to the preferred embodiment of the invention described here, the first rotation means 8 preferably comprise an inner gear 67 supported by the bearing frame 2 and operatively connected to one of the rotation shafts of one of the kinematic mechanisms 3 through a main hydraulic control unit, numbered overall with 68, adapted to be operated by such a rotation shaft to rotate the reference rotor 6 around the linear axis Y:
  in a first direction when the driving machine 1 of the invention advances on the ground T along a first predetermined direction $D_1$ unwinding the power supply cable 5 from the reference rotor 6, as it can be seen in FIG. 1;
  in a second direction, opposite to the first direction, when the driving machine 1 of the invention advances on the ground T along a second predetermined direction $D_2$, opposite to the first predetermined direction $D_1$, rewinding the power supply cable 5 around the reference rotor 6, as can be seen again in FIG. 1.

More in detail, FIGS. 10 and 14 show that the inner gear 67 includes, purely by way of example:
  an outer annular crown 69 arranged at an annular edge 70 delimiting a through hole 71 made in one of the side flanges 27, 28 of the internally hollow cylindrical drum 26;
  an inner pinion 72 coupled to a protruding element 73 of a structural group 74 belonging to the bearing frame 2: the inner pinion 53 engages the outer annular crown 69 to rotate it around the linear axis Y and is operatively connected to the rotation shaft of one of the kinematic mechanisms 3 (such as the tracks 12, 13, as mentioned).

In addition, the main hydraulic control unit 68 comprises two hydraulic pumps, not shown, keyed to one of the rotation shafts of one of the kinematic mechanisms 3: during the maneuver at field edge B, one hydraulic pump rotates in one direction while the other hydraulic pump rotates in the opposite direction so that the oil supplied to the reference rotor 6 is zeroed: by doing so, this essential component of the driving machine 1 of the invention remains stationary, without rotating, while at field edge B the rotation of the kinematic mechanism 3, of the bearing frame 2 by a first angle of 90° and, after a short transversal path of length equal to the width of the work equipment $L_1$, $L_2$, by a second angle of 90°.

Furthermore, the aforesaid type of connection between the first rotation means 8 and the kinematic mechanisms 3 makes the rotation speed of the reference rotor 6 supporting the electric coil 7 proportional to the speed of the kinematic mechanisms 3, in particular of the tracks 12, 13 which preferentially compose them.

Under an advantageous but not essential profile, the driving machine 1 of the invention also comprises an auxiliary hydraulic control unit, indicated overall with 75, coupled to the bearing frame 2 at the rear part 2c and operatively connected to the oil tank 52 coupled to the reinforcing base 53 of the bearing frame 2, adapted to be operated to move the work equipment $L_1$, $L_2$ arranged in the front part 2b and/or in the rear part 2c of the bearing frame 2.

The auxiliary hydraulic control unit 75 comprises, in this case, a hydraulic pump, not shown for simplicity, submerged in the oil tank 52 and a respective electric service motor 76 coupled to the reinforcing base 53 and electrically connected to the central processing and control unit.

It is understood, however, that in other embodiments of the driving machine of the invention, the auxiliary hydraulic control unit may also comprise two submerged hydraulic pumps: this solution is particularly suitable when work equipment (such as a multi-plough) provided with multiple mechanisms must be used, some of which can be operated separately and autonomously by others to perform the most correct and effective working of the ground possible.

In light of the foregoing, it is evident that the oil tank 52 supplies the users including the first hydraulic cylinder 51, the second hydraulic cylinders 55, 56 and the hydraulic cylinders 77, 78, the latter arranged in this case only in the rear part 2c of the bearing frame 2 and useful for lifting and lowering the work equipment $L_2$ mounted in the rear part 2c.

The movement or actuation of all the aforesaid hydraulic cylinders 51, 55, 56, 77 and 78 occurs through the auxiliary hydraulic unit 75 that is electrically connected to the central processing and control unit which governs the operation thereof and which is present in the control panel 10 arranged in the technical room 11.

In a somewhat advantageous but non-limiting manner, the driving machine 1 of the invention comprises an electronic receiver for positioning and assisted satellite navigation 79, seen in FIGS. 10 and 14, which:

is arranged in the central part 2a of the bearing frame 2;
communicates through a radio signal O with a network of artificial satellites in orbit;
is electrically connected to the central processing and control unit mounted in the control panel 10 arranged in the technical room 10 of the bearing frame 2.

In particular, the electronic satellite receiver 79 is a classic GPS receiver (acronym for "Global Positioning System"), provided with a so-called "active" type of assisted navigation technology, contained in the reference rotor 6, arranged at the linear rotation axis Y of the latter and supported by the structural group 74 of the bearing frame 2.

Even more particularly, the electronic satellite receiver 79 is a GPS receiver integral with the first actuation means 50 and arranged at a central point 145b of an upper face 45b, opposite to the lower face 45a, of the first gear wheel 45 belonging to the second rotation means 8.

Figure 17:
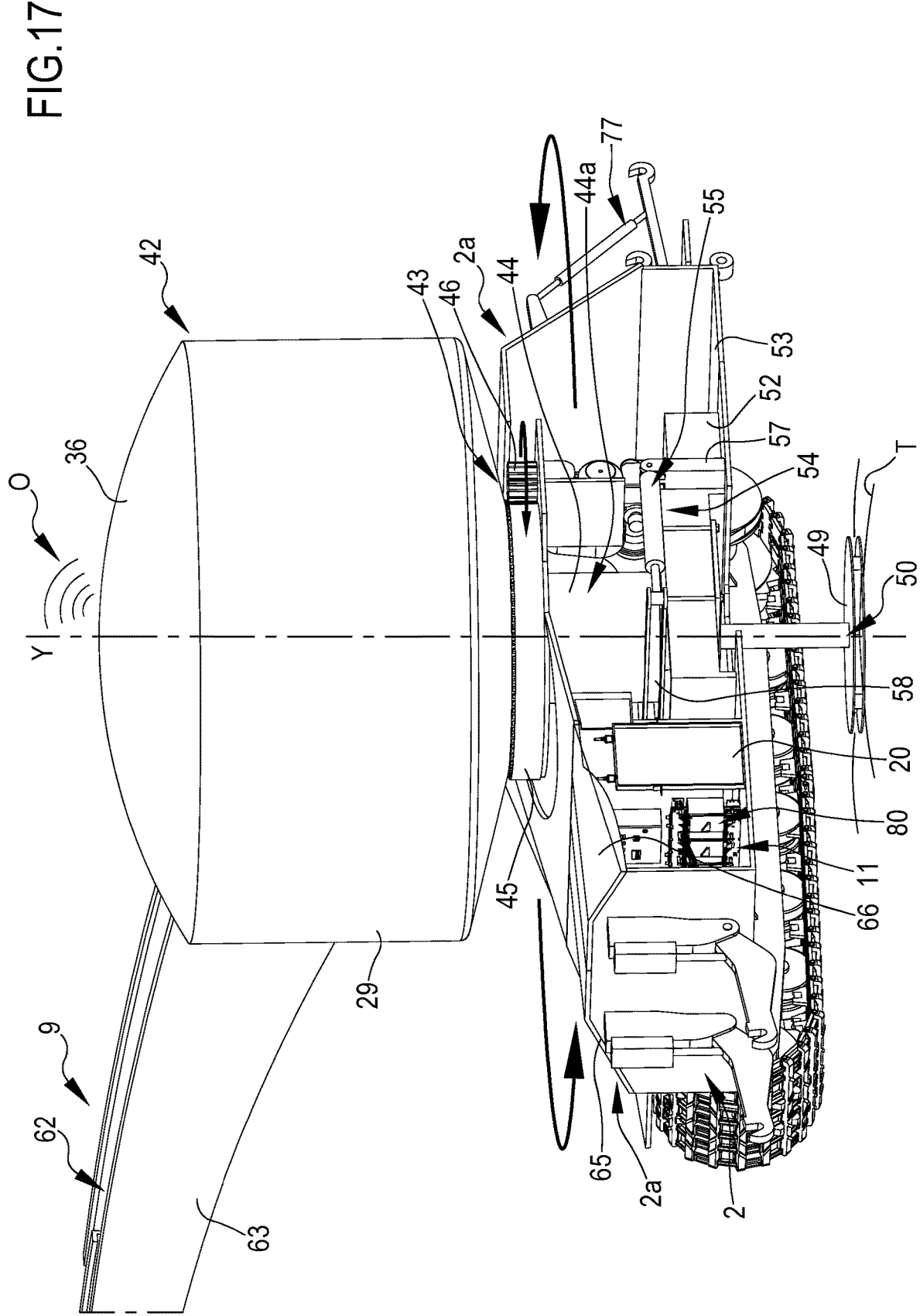
FIG. 17 is a truncated, simplified, partially cut-away assonometric view of the machine of FIGS. 2-6, in operating condition, distinct from that of FIGS. 14-16, which it still takes at field edge, at the end of the working of a longitudinal band of ground plot and after turning to begin working the adjacent longitudinal band of ground plot.

FIGS. 7 and 17 also show the presence of a transformer 80 useful to reduce the intensity of the electric current supplied at 220 V to the service components such as solenoid valves, central processing and control unit, lighting means and so on.

FIG. 1 shows in a simplified manner the working diagram which can be effectively and advantageously exploited and, for all intents and purposes, followed by the driving machine 1 of the invention, which cannot be achieved with the driving machines of known type, powered by an electric cable connected to an electricity source: compared to these ones, the driving machine 1 of the invention allows almost to half the consumption required to work a given plot P of ground T.

In summary, once the power supply cable 5 has been connected to the auxiliary service column E present at the reference point R (coinciding in this case with the power supply source) connected to the power plant C, the self-propelled driving machine 1 of the present invention, without any operator on board, is conveniently although not necessarily guided from the reference point R to the starting point I by traveling empty, without carrying out any work on the ground, firstly the first path $T_1$ at the central part N of the plot P of ground T and subsequently the second path $T_2$, transversal to the first path $T_1$, at a first side field edge G, according to the travel direction given by the respective arrows.

In these two empty travels $T_1$ and $T_2$, the driving machine 1 of the invention is moved keeping the rear part 2c in front with respect to the travel direction, given by the arrows $T_1$, $T_2$, as if proceeding in reverse, while the power supply cable 5 is unwound by the reference rotor 6.

Having reached the starting point I at field edge B, the invention driving machine 1, without having to perform any maneuver, is ready to start working the longitudinal band $F_1$ of the plot P of ground T with the work equipment $L_1$, $L_2$ thereof, already having the front part 2b of the bearing frame 2 in front and the distribution arm 9 to the right of the bearing frame 2, frontally thereto and to the work equipment $L_1$, in respect to the advancement direction of the driving machine 1 on the ground T.

The driving machine 1 therefore works the first section of the first longitudinal band $F_1$, guided by the GPS based on the cross-linked navigation program set in the central processing and control unit and rewinding the power supply cable 5 around the reference rotor 6 until it reaches the central part N.

At this point, seamlessly (i.e., without interrupting the advancement speed and the travel direction of the self-propelled driving machine 1 of the invention and without changing the position of the bearing frame 2), the central processing and control unit operates the low voltage-type electric motor 48 of the auxiliary electric motorization means 47, thus obtaining the prompt and rapid clockwise rotation, by an angle of about 90°, of the central support turret 29 (and therewith of the distribution arm 9) while the driving machine 1 advances with the front part 2b of the bearing frame 2 arranged in front, unwinding the supply cable again from the reference rotor 6.

Therefore, at the central part N, the distribution arm 9 changes the position thereof with respect to the bearing frame 2 and with respect to the travel direction of the driving machine 1 of the invention, moving behind the bearing frame 2 while remaining to the right of the latter: in similar conditions, the second section is worked, aligned in sequence with respect to the first section of which it is the continuation, of the first longitudinal band $F_1$ up to the first end point U, symmetrically opposite to the starting point I, at field edge B.

At the first end point U, the self-propelled driving machine 1 of the invention is moved according to what has been described above in relation to, in the order:

lowering the lifting platform 49 against the ground T;

actuation of the tracks 12, 13 of the kinematic mechanisms 3 in a differentiated manner to obtain a first 90° rotation, in this case clockwise, of the kinematic mechanisms 3 themselves and of the bearing frame 2;

lifting the lifting platform 49;

rotation of the central support turret 29 and therewith of the distribution arm 9 supporting the power supply cable 5 while the driving machine 1 travels along the transversal section V equal to the width of the work equipment $L_1$, $L_2$;

lowering the lifting platform 49 against the ground T;

actuation of the tracks 12, 13 of the kinematic mechanisms 3 in a different manner to obtain a second 90° rotation, always in a clockwise direction, of the kinematic mechanisms 3 themselves and of the bearing frame 2;

lifting the lifting platform 49.

The invention driving machine 1 is thus immediately ready to work the longitudinal band $F_2$ directly adjacent to the first longitudinal band $F_1$ just worked following the exact same operating mode just described for the band $F_1$, continuing, in particular, for the first section of the band $F_2$ (up to the central part N) again with the front part 2b of the bearing frame 2 in front and the distribution arm 9 to the right of the bearing frame 2, in front thereto and to the work equipment $L_1$, in respect to the advancement direction of the driving machine 1 on the ground T.

The working of the entire plot P of ground T is completed following this operating sequence, in a short time, with maximum operating efficiency and without the aid of any operator on board the self-propelled driving machine 1 of the invention.

On the basis of the description provided before, it is, therefore, understood that the electric powered self-propelled driving machine of the invention for working a ground achieves the purposes and actualizes the advantages previously mentioned.

Upon execution, changes could be made to the electric powered self-propelled driving machine for working the ground of the invention, consisting, for example, of kinematic mechanisms other than those described above and shown in the accompanying figures, and consisting for example of a plurality of tires symmetrically arranged with respect to the bearing frame of the driving machine.

In addition to this, there may be further embodiments of the electric powered self-propelled driving machine of the present invention, not shown in the appended drawings, in which the reference rotor may have a different constructional concept from that highlighted previously with reference to the preferred embodiment of the invention described, with the aid of the accompanying figures.

In addition, in other executive variants of the electric powered self-propelled driving machine of the invention, not shown, the first rotation means may have different constructional composition and position in the overall dimensions of the bearing frame of the machine from those described above in relation to the preferred embodiment of the invention.

It should be noted that also an electric powered self-propelled driving machine provided, specifically, essentially with the lifting platform (and together therewith, in particular, the central support turret) described above, operatively connected to the first actuation means acting in a vertical direction, to place it alternately in a lowered position close to the ground and in a raised position therefrom when it reaches the field edge of the ground while working and it is thus required to reverse the advancement direction of the machine itself, could be the subject of any separate, dedicated and independent patent by filing a divisional application including a specific formulation of the main and independent claim which generically claims the aforesaid technical concept.

Similarly, also an electric powered self-propelled driving machine specifically provided essentially with means for guiding the reference rotor (and therewith not only the electric power supply cable coil but also, particularly, the central support turret), operatively connected to second actuation means acting in a horizontal direction, could be the subject of a possible separate, dedicated and independent patent by filing a divisional application including a specific formulation of the main and independent claim which generically claims the aforesaid technical concept.

Furthermore, also an electric powered self-propelled driving machine specifically provided essentially with means for conveying the cooling air both for the power supply cable and the electrical panel, means for converting electricity (such as inverters) and electric motorization means could be the subject of a possible separate, dedicated and independent by filing a divisional application including a specific formulation of the main and independent claim which generically claims the aforesaid technical concept.

Even an electric powered self-propelled driving machine essentially provided with a distribution arm which can be folded back thereon, as it consist of a plurality of tubular portions two by two rotatably coupled each other through a rotation hinge arranging the distribution arm alternately in the operating position and in the rest position previously defined, could be the subject of a separate and independent patent by filing a divisional application including a specific formulation of the main and independent claim which generically claims the aforesaid technical concept.

Another potential subject of an independent and separate patent, through the related filing of a divisional application substantially based on the technical material described here, is also an electric powered self-propelled driving machine generally claiming a mechanical system which allows the regular, rapid, and effective reverse movement thereof without causing dangerous and harmful interference with the power supply cable.

Finally, it's clear that many other changes could be made to the electric powered self-propelled driving machine concerned, without departing from the novelty principles inherent in the inventive idea, just as it's clear that in the practical invention actuation, materials, shapes and sizes of the details shown could be any according to the requirements and replaced by others technically equivalent.

Where the constructional features and techniques mentioned in the following claims are followed by reference signs or numerals, such reference signs were introduced for the sole purpose of increasing intelligibility of the claims themselves, and therefore such reference signs have no limiting effect on the interpretation of each element identified by way of example only by such reference signs.

The invention claimed is:

1. Electric powered self-propelled driving machine for working a ground comprising:

a bearing frame adapted to remain at a given distance from a reference surface when said machine is assembled;

kinematic mechanisms coupled to said bearing frame and adapted to be arranged close to said reference surface when said machine is in use conditions;

electric motorization means, coupled to said bearing frame and operatively connected to said kinematic mechanisms, adapted to be electrically operated to move said bearing frame;

a power supply cable adapted to be electrically connected to said electric motorization means and to be connected to an electric power supply source;

a reference rotor around which said power supply cable is wound to form an electric coil of predefined length, coupled to said bearing frame and operatively connected to first rotation means adapted to be operated to unwind/rewind said power supply cable from/onto said reference rotor at least during the advancement of said driving machine while working on a ground;

a distribution arm, operatively connected to said bearing frame and supporting said power supply cable so as to at least limit the interference thereof with said kinematic mechanisms during said advancement of said driving machine on said ground, characterized in that said reference rotor, and said electric coil wound thereon, are arranged in the central part of said bearing frame so that both the front part and the rear part of said bearing frame are frontally free and directly facing the external environment in order to accommodate both, removably, pieces of equipment for working said ground.

2. The machine according to claim 1, characterized in that said reference rotor, and said electric coil wound thereon, are positioned at the weight gravity center defined by said bearing frame and said equipment for working said ground.

3. The machine according to claim 1, characterized in that said reference rotor defines a linear rotation axis, around which said electric coil is wound/unwound during said advancement of said driving machine, which is horizontal.

4. The machine according to claim 1, characterized in that said reference rotor defines a linear rotation axis, around which said electric coil is wound/unwound during said advancement of said driving machine, which is vertical.

5. The machine according to claim 1, characterized in that it comprises a central processing and control unit, installed in a control panel arranged in a technical room made in said bearing frame, adapted to be electrically connected to a power supply source and to manage the actuation and operation of at least said electric motorization means and said first rotation means.

6. The machine according to claim 5, characterized in that said kinematic mechanisms comprise a pair of tracks opposite to each other which are symmetrically arranged with respect to a longitudinal axis of said bearing frame and each extend along a linear direction parallel to said longitudinal axis.

7. The machine according to claim 6, characterized in that each of said tracks comprises a modular chain provided with rigid ridges monolithic thereto and made of metallic material of high mechanical strength.

8. The machine according to claim 6, characterized in that each of said tracks comprises a modular chain provided with rigid monolithic ridges and made of elastomeric material of high mechanical strength.

9. The machine according to claim 6, characterized in that said electric motorization means include a pair of electric motors arranged in said rear part of said bearing frame and symmetrically with respect to a longitudinal axis of said bearing frame.

10. The machine according to claim 9, characterized in that each of said electric motors is contained in a box-shaped protective body arranged above each of said tracks and adapted to physically isolate it from the external environment.

11. The machine according to claim 10, characterized in that it comprises pneumatic suction means coupled to said bearing frame near said electric motorization means, adapted to be operated to suck in clean air from above coming from the outside and to circulate it inside said bearing frame to cool the components subject to overheating.

12. The machine according to claim 11, characterized in that said pneumatic suction means comprise a pair of axial fans, each of which:
contained in said box-shaped protective body;
one side facing the outside and the opposite side facing one of said electric motors;
communicating with said technical room through a pair of side channels opposite to each other defined in said bearing frame laterally to said central turret and symmetrically with respect to said longitudinal axis of said bearing frame.

13. The machine according to claim 12, characterized in that said axial fans are operatively connected to temperature sensors electrically connected to said central processing and control unit and adapted to enable the actuation of said axial fans upon exceeding a prefixed threshold value of said temperature inside said bearing frame.

14. The machine according to claim 9, characterized in that said electric motorization means cooperate electrically with electric current conversion devices adapted to:
stand between an electric power supply source and said electric motorization means;
be operated in a differentiated manner so as to rotate at least said kinematic mechanisms and said bearing frame and possibly said work equipment by an angle of 180° when said machine, once said working of a longitudinal band of a plot of said ground has ended, reaches the edge of said plot of said ground, and to place said machine in the position useful to start said working of the next and directly adjacent longitudinal band of said plot of said ground.

15. The machine according to claim 11, characterized in that said electric current conversion devices comprise a pair of inverters contained in said technical room defined in said bearing frame, each of which electrically connected, on one side, to said central processing and control unit which manages the operation thereof and, on the other side, to a respective of said electric motors.

16. The machine according to claim 14, characterized in that said reference rotor is rotated to unwind/wind said power supply cable and is coaxially housed inside a central support turret coupled to said bearing frame and defining with said reference rotor an inner annular chamber partly occupied by said power supply cable and adapted to allow the passage of clean air coming from the outside.

17. The machine according to claim 16, characterized in that it comprises distribution means, contained in said inner annular chamber and coupled externally to said reference rotor or internally to said central support turret, cooperating with said power supply cable to distribute it uniformly and neatly on a side wall of said reference rotor, according to a tapered configuration leaving said inner annular chamber at least partly free.

18. The machine according to claim 17, characterized in that said reference rotor is provided with a covering dome protruding almost annularly from an outer edge of said central turret to allow said air to enter into said inner annular chamber and adapted to be moved between a normally taken closed position and a temporarily taken open position.

19. The machine according to claim 18, characterized in that said covering dome has a rounded shape and is provided externally with lighting means adapted to be operated during the night operation of said machine to signal the presence thereof.

20. The machine according to claim 17, characterized in that said central support turret, from which said distribution arm protrudes cantilevered and by means of which said distribution arm is coupled to said bearing frame, is coupled through second rotation means to a tubular element coupled to said bearing frame and coaxial to said reference rotor and to said central turret.

21. The machine according to claim 20, characterized in that said tubular element supporting said central support turret is coupled to said bearing frame through second actuation means adapted to be operated:
when said machine, after said working of said longitudinal band of said plot of said ground, reaches said edge of said plot of said ground;
in presence of said work equipment which, during said working of said ground, spreads product on said ground, gradually losing weight,
to horizontally slide said central turret, said reference rotor and said electric coil wound thereon up to the updated position, progressively variable during said working, of the weight gravity center defined by said bearing frame and by said equipment for working said ground.

22. The machine according to claim 21, characterized in that said second actuation means comprise at least a second hydraulic cylinder operating according to a horizontal axis, fixed to a protruding support bracket of said bearing frame and to a transversal reinforcing bar of said bearing frame coupled to an external wall of said tubular element, said second hydraulic cylinder being hydraulically connected to an oil tank fixed to a reinforcing base belonging to said bearing frame.

23. The machine according to claim 20, characterized in that said second rotation means, integral with said tubular element, comprise:
a first gear wheel interposed between said central turret and said tubular element;
a second gear wheel, having a diameter smaller than the diameter of said first gear wheel in which it engages, operatively connected to auxiliary electric motorization means, integral with said tubular element, electrically operated to determine the rotation of said central turret, and therewith of said distribution arm, clockwise and counterclockwise, when said driving machine, at the edge of a plot of said ground, moves between a just-worked longitudinal band of said plot and a next and directly adjacent longitudinal band to be worked of said plot.

24. The machine according to claim 23, characterized in that it comprises a lifting platform defining a horizontal plane and coupled to said first gear wheel through first actuation means adapted to be operated to arrange said lifting platform selectively between:
a raised position, taken at least during said advancement of said driving machine for the execution of said working of said ground, in which said lifting platform falls within the vertical overall dimensions of said kinematic mechanisms;
a lowered position, taken when said driving machine, having finished said working of said longitudinal band of said plot of said ground, reaches said edge of said plot, in which said lifting platform protrudes from said vertical overall dimensions of said kinematic mechanisms until it interferes in a planar manner with said ground, lifting or uncoupling from said ground at least said bearing frame, said kinematic mechanisms, said central support turret and, if required, said work equipment to allow the subsequent rotation by an angle of at least 90° of said bearing frame, of said kinematic mechanisms, of said central support turret and, if required, of said work equipment.

25. The machine according to claim 24, characterized in that said first actuation means comprise a first hydraulic cylinder operating according to a vertical axis, fixed to the central point of a lower face of said first gear wheel and to the central point of an upper face of said lifting platform and hydraulically connected to an oil tank coupled to a reinforcing base belonging to said bearing frame and positioned at said rear part of said bearing frame.

26. The machine according to claim 25, characterized in that it comprises an electronic receiver for positioning and assisted satellite navigation, arranged in said central part of said bearing frame, communicating through a radio signal with a network of artificial satellites in orbit and electrically connected to a central processing and control unit installed in a control panel arranged in a technical room made in said bearing frame.

27. The machine according to claim 26, characterized in that said electronic satellite receiver is a GPS receiver integral with said first actuation means and arranged at a central point of an upper face, opposite to said lower face, of said first gear wheel of said second rotation means.

28. The machine according to claim 16, characterized in that the inner volume of said central support turret communicates with said technical room of said bearing frame and said technical room communicates with said electric motorization means.

29. The machine according to claim 9, characterized in that said electric motorization means are operatively connected to said kinematic mechanisms through:
speed variation means contained in the inner part of said bearing frame;
motion transmission means contained in the inner part of said kinematic mechanisms, suitable to vary the advancement speed of said machine on said ground according to the type of working to be carried out on said ground.

30. The machine according to claim 29, characterized in that said speed variation means comprise, for each of said electric motors, a V-belt, closed in a ring, and a pair of pulleys, spaced apart from each other and having rotation axes parallel to each other, in which said V-belt is engaged.

31. The machine according to claim 29, characterized in that said transmission means include a pair of epicyclic gears, one for each of said tracks.

32. The machine according to claim 1, characterized in that said power supply cable is of the three-phase type and has a diameter between 38 and 45 mm.

33. The machine according to claim 1, characterized in that said reference rotor is supported by a structural unit belonging to said bearing frame and arranged in said central part of said bearing frame.

34. The machine according to claim 1, characterized in that said reference rotor comprises an internally hollow cylindrical drum, provided with side containment flanges and having a frusto-conical or tapered shape along a linear rotation axis defined by said reference rotor and a dimensional extension in height and width adapted to help avoid dangerous overheating of said power supply cable while being wound/unwound onto/from a side wall of said cylindrical drum.

35. The machine according to claim 34, characterized in that said first rotation means comprise an inner gear supported by said bearing frame and operatively connected to one of the rotation shafts of one of said kinematic mechanisms through a main hydraulic control unit adapted to be operated by said rotation shaft to rotate said reference rotor around a linear axis:
   in a first direction when said machine advances on said ground along a first predetermined direction unwinding said power supply cable from said reference rotor;
   in a second direction, opposite to said first direction, when said machine advances on said ground along a second predetermined direction, opposite to said first predetermined direction, rewinding said power supply cable around said reference rotor.

36. The machine according to claim 35, characterized in that said inner gear includes:
   an outer annular crown gear arranged at an annular edge delimiting a through hole made in one of said side flanges of said cylindrical drum;
   an inner pinion coupled to a protruding element of a structural group belonging to said bearing frame, engaging said outer annular crown gear to rotate it around said linear axis and operatively connected to said rotation shaft of one of said kinematic mechanisms.

37. The machine according to claim 1, characterized in that a side wall of said reference rotor has a plurality of through openings adapted to allow the passage of clean air coming from the outside.

38. The machine according to claim 1, characterized in that said distribution arm slidably supports said power supply cable through sliding means contained within the overall dimensions of said distribution arm.

39. The machine according to claim 38, characterized in that said sliding means comprise a plurality of idle rollers made of a material with a low friction coefficient, two by two facing and spaced apart from each other so as to define within said overall dimensions of said distribution arm a longitudinal channel for the passage of said power supply cable.

40. The machine according to claim 39, characterized in that said idle rollers are arranged two by two so as to define linear directions converging with each other to avoid the accidental separation of said power supply cable from said distribution arm.

41. The machine according to claim 1, characterized in that said distribution arm is of the foldable type being divided into a plurality of shaped portions having an inner volume communicating with the external environment, each of which coupled to the adjacent one having greater dimensions through a rotation hinge adapted to arrange said distribution arm alternately in:
   an operating position, taken when said driving machine is in operating conditions, in which said distribution arm extends for the maximum length thereof and said shaped portions are arranged aligned in sequence with one another;
   a rest position, taken when said driving machine is in non-operating conditions or during transport to reduce the size thereof, in which said distribution arm has a shorter length than said maximum length and at least two of said shaped portions are arranged one partially and rotatably retracted into the other one immediately adjacent thereto.

42. The machine according to claim 1, characterized in that it comprises an auxiliary hydraulic unit coupled to said bearing frame at the rear part and operatively connected to an oil tank coupled to a reinforcing base belonging to said bearing frame, adapted to be operated to move said work equipment arranged in said front part and/or in said rear part of said bearing frame.

43. The machine according to claim 42, characterized in that said auxiliary hydraulic unit comprises at least one hydraulic pump submerged in said oil tank and at least one respective electric service motor coupled to said reinforcing base and electrically connected to a central processing and control unit.

44. The machine according to claim 1, characterized in that it comprises an electronic receiver for positioning and assisted satellite navigation, arranged in said central part of said bearing frame, communicating through a radio signal with a network of artificial satellites in orbit and electrically connected to a central processing and control unit installed in a control panel arranged in a technical room made in said bearing frame.

45. The machine according to claim 44, characterized in that said electronic satellite receiver is a GPS receiver contained in said reference rotor, arranged at a linear rotation axis of said reference rotor and supported by a structural unit belonging to said bearing frame.

* * * * *